(12) United States Patent
Seguchi

(10) Patent No.: US 11,870,312 B2
(45) Date of Patent: Jan. 9, 2024

(54) FIELD COIL TYPE ROTATING ELECTRIC MACHINE

(71) Applicant: DENSO CORPORATION, Kariya (JP)

(72) Inventor: Masahiro Seguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 468 days.

(21) Appl. No.: 17/205,026

(22) Filed: Mar. 18, 2021

(65) Prior Publication Data

US 2021/0226499 A1 Jul. 22, 2021

Related U.S. Application Data

(63) Continuation of application No. PCT/JP2019/034472, filed on Sep. 2, 2019.

(30) Foreign Application Priority Data

Sep. 25, 2018 (JP) ................................ 2018-179512

(51) Int. Cl.
*H02K 3/28* (2006.01)
*H02K 1/22* (2006.01)

(52) U.S. Cl.
CPC ................ *H02K 3/28* (2013.01); *H02K 1/22* (2013.01); *H02K 2213/03* (2013.01)

(58) Field of Classification Search
CPC ......... H02K 1/22; H02K 3/28; H02K 2213/03
See application file for complete search history.

(56) References Cited

U.S. PATENT DOCUMENTS

| 9,876,455 | B2* | 1/2018 | Seguchi | H02K 19/28 |
| 10,250,175 | B2* | 4/2019 | Seguchi | H02K 1/26 |
| 2008/0079375 | A1* | 4/2008 | Seguchi | H02P 27/08 |
| | | | | 318/722 |
| 2019/0207491 | A1 | 7/2019 | Seguchi | |
| 2019/0296623 | A1* | 9/2019 | Herrmann | H02K 11/02 |
| 2019/0296672 | A1* | 9/2019 | Seguchi | H02P 25/03 |

FOREIGN PATENT DOCUMENTS

| JP | 2010-273476 A | 12/2010 |
| JP | 2014-7837 A | 1/2014 |

OTHER PUBLICATIONS

Nov. 12, 2019 Search Report issued in International Patent Application No. PCT/JP2019/034472.

\* cited by examiner

*Primary Examiner* — Jue Zhang
(74) *Attorney, Agent, or Firm* — Oliff PLC

(57) ABSTRACT

A field coil type rotating electric machine includes a field coil having first and second windings connected in series with each other, a rotor having main poles on which the first and second windings are wound, and a stator having a stator coil comprised of phase windings to which harmonic currents are respectively supplied to induce field current in the field coil. In the rotor, there are formed a series resonant circuit including the first winding and a capacitor and a parallel resonant circuit including the second winding and the capacitor. The first winding is radially located closer to the stator than the second winding is. Moreover, N1<N2 and 120°<θs<240°, where N1 and N2 are respectively the numbers of turns of the first and second windings and θs is a phase offset between electric currents flowing respectively in the series and parallel resonant circuits.

8 Claims, 14 Drawing Sheets

$$\left( \begin{array}{l} \cdot f1 = \dfrac{1}{2\pi\sqrt{L1 \times C}} \\ \cdot f2 = \dfrac{1}{2\pi\sqrt{L2 \times C}} \end{array} \right)$$

(a) FUNDAMENTAL CURRENT (b) HARMONIC CURRENT (c) RESULTANT CURRENT (a) FUNDAMENTAL CURRENT (b) HARMONIC CURRENT (c) RESULTANT CURRENT

FIG.8
| PATTERN | | 1 | 2 | 3 | 4 |
|---|---|---|---|---|---|
| DIRECTIONS OF INDUCED VOLTAGES | e1 71a | ↑ | ↓ | ↑ | ↓ |
| | e2 71b | ↑ | ↑ | ↓ | ↓ |
FIG.9A
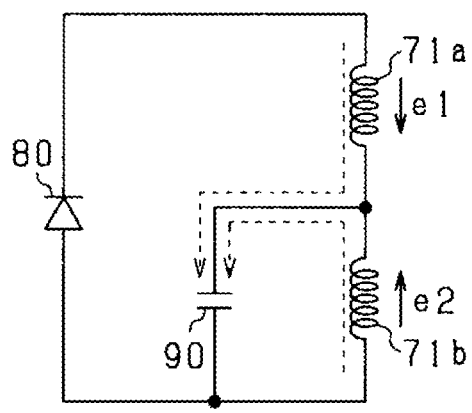
FIG.9B
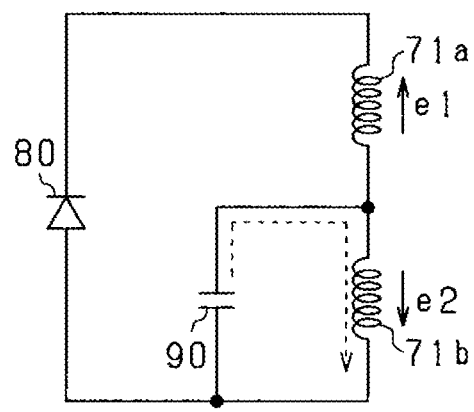

FIELD COIL TYPE ROTATING ELECTRIC MACHINE

CROSS-REFERENCE TO RELATED APPLICATIONS

The present application is a continuation application of International Application No. PCT/JP2019/034472 filed on Sep. 2, 2019, which is based on and claims priority from Japanese Patent Application No. 2018-179512 filed on Sep. 25, 2018. The contents of these applications are hereby incorporated by reference in their entirety into the present application.

BACKGROUND

1 Technical Field

The present disclosure relates to field coil type rotating electric machines.

2 Description of Related Art

There is known, for example from Japanese Patent Application Publication No. JP 2018-042401 A, a field coil type rotating electric machine. This machine includes a stator having a stator coil, a field coil including a serially-connected winding pair consisting of first and second windings, a rotor having a rotor core and a plurality of main poles, and a diode. The main poles are formed, at predetermined intervals in a circumferential direction, to radially protrude from the rotor core. The diode has its cathode connected to a first-winding-side end of the serially-connected winding pair and its anode connected to a second-winding-side end of the serially-connected winding pair. Each of the first and second windings is wound on all of the main poles. The stator coil is comprised of a plurality of phase windings. In operation, each of the phase windings of the stator coil is supplied with both fundamental current mainly for generating torque and harmonic current mainly for exciting the field coil.

Upon supply of the harmonic currents to the phase windings of the stator coil, main magnetic flux flows through a magnetic circuit which includes the main poles circumferentially adjacent to one another and the rotor core. Consequently, with the main magnetic flux flowing through the magnetic circuit, voltages are induced respectively in the first and second windings that are serially connected with each other, thereby inducing electric currents respectively in the first and second windings. The electric currents induced in the first and second windings are then rectified by the diode to flow in one direction, namely the rectification direction. As a result, field current flows in the field coil in the rectification direction, thereby exciting the field coil.

On the other hand, upon supply of the harmonic currents to the phase windings of the stator coil, leakage magnetic flux is also generated in addition to the main magnetic flux. The leakage magnetic flux flows between each circumferentially-adjacent pair of the main poles without flowing through the rotor core, crossing the field coil. Upon the leakage magnetic flux crossing the field coil, the voltages induced respectively in the first and second windings may become opposite in polarity to each other, thereby reducing the sum of the electric currents induced respectively in the first and second windings and thus the field current flowing in the field coil.

To solve the above problem, the known field coil type rotating electric machine further includes a capacitor that is connected in parallel with the second winding. Consequently, both a series resonant circuit including the first winding and the capacitor and a parallel resonant circuit including the second winding and the capacitor are formed, thereby increasing the field current.

SUMMARY

According to the present disclosure, there is provided a field coil type rotating electric machine which includes a stator, a field coil and a rotor. The stator includes a stator coil that is comprised of a plurality of phase windings. The field coil includes a serially-connected winding pair consisting of a first winding and a second winding that are connected in series with each other. The rotor includes a rotor core and a plurality of main poles formed at predetermined intervals in a circumferential direction and each radially protruding from the rotor core. Moreover, each of the first and second windings of the field coil is wound on all of the main poles of the rotor. Each of the phase windings of the stator coil is configured to be supplied with harmonic current to induce field current in the field coil. The rotating electric machine further includes a diode and a capacitor. The diode has its cathode connected to a first-winding-side end of the serially-connected winding pair and its anode connected to a second-winding-side end of the serially-connected winding pair. The capacitor is connected in parallel with the second winding. In the rotating electric machine, there are formed both a series resonant circuit including the first winding and the capacitor and a parallel resonant circuit including the second winding and the capacitor. The first winding is radially located closer to the stator than the second winding is. Furthermore, $N1<N2$, where $N1$ is the number of turns of the first winding and $N2$ is the number of turns of the second winding. The inductances of the first and second windings are set to satisfy: $120°<\theta s<240°$, where $\theta s$ is a phase offset between electric current flowing in the series resonant circuit and electric current flowing in the parallel resonant circuit.

BRIEF DESCRIPTION OF THE DRAWINGS

FIG. 8 is a table illustrating patterns of voltages induced in first and second windings of a field coil of the field coil type rotating electric machine.

FIGS. 9A and 9B are schematic circuit diagrams illustrating the flow of electric currents induced in the first and second windings of the field coil, the electric currents corresponding to the patterns 2 and 3 shown in FIG. 8.

DESCRIPTION OF EMBODIMENTS

Figure 1:
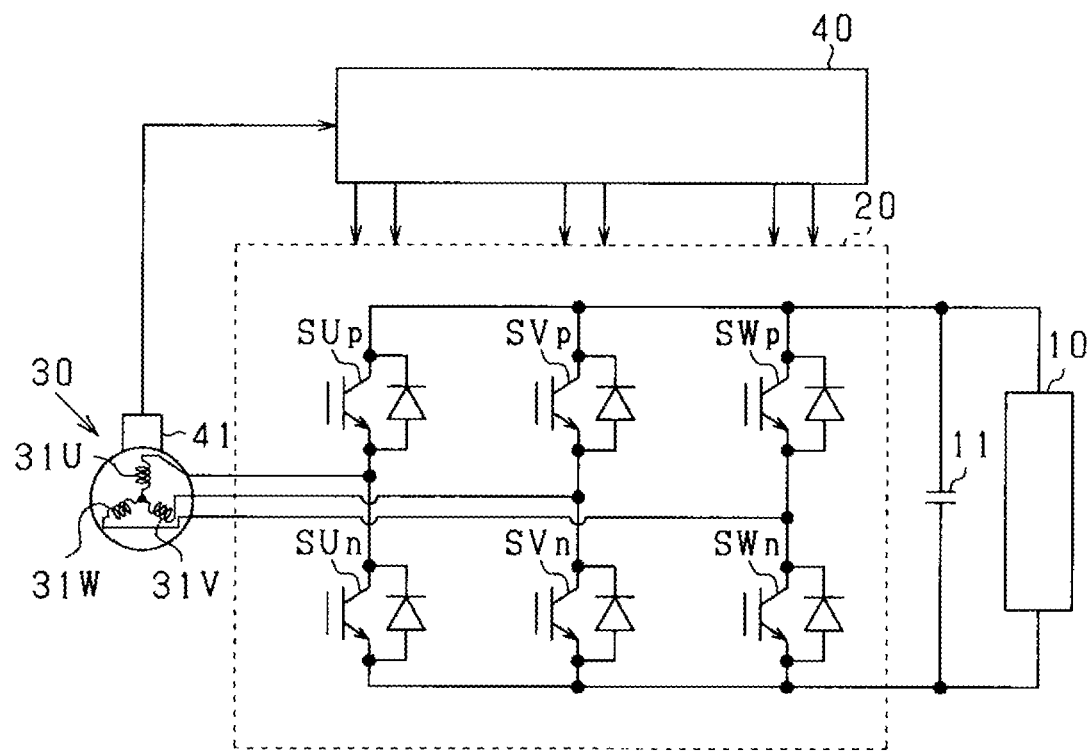
FIG. 1 is an overall configuration diagram of a rotating electric machine system which includes a field coil type rotating electric machine according to a first embodiment.

The inventor of the present application has found that there is still room to further increase the field current in the known field coil type rotating electric machine described above. Moreover, the inventor of the present application has also found that ripple of the field current may become high depending on the configuration of the field coil in the known field coil type rotating electric machine.

In the above-described field coil type rotating electric machine according to the present disclosure, the number of turns N1 of the first winding and the number of turns N2 of the second winding are set to satisfy the relationship of (N1<N2). Consequently, it becomes possible to set the resonance frequency of the series resonant circuit and the resonance frequency of the parallel resonant circuit to be equal to each other, thereby effectively increasing the field current and thus the torque of the rotating electric machine. Moreover, the supply of the harmonic currents to the phase windings of the stator coil causes the magnetic field applied to the field coil to vary. The first winding is radially located closer to the stator than the second winding is; therefore, the variation in the magnetic field applied to the first winding is greater than the variation in the magnetic field applied to the second winding. Further, the variation in the magnetic field applied to the field coil causes the field current flowing in the field coil to vary. Since the variation in the magnetic field applied to the first winding is greater than the variation in the magnetic field applied to the second winding, the variation in the electric current flowing through the first winding is accordingly greater than the variation in the electric current flowing through the second winding. In view of the above, the number of turns N1 of the first winding is set to be smaller than the number of turns N2 of the second winding. Consequently, it becomes possible to suppress the ripple of the field current flowing in the field coil while increasing the field current. In addition, the phase offset θs between the electric current flowing in the series resonant circuit and the electric current flowing in the parallel resonant circuit is set to be in the range of (120°<θs<240°). Consequently, the variation in the electric current flowing through the first winding can be at least partially canceled by the variation in the electric current flowing through the second winding, thereby further suppressing the ripple of the field current flowing in the field coil.

Exemplary embodiments will be described hereinafter with reference to the drawings. It should be noted that for the sake of clarity and understanding, identical components having identical functions throughout the whole description have been marked, where possible, with the same reference numerals in the drawings and that for the sake of avoiding redundancy, descriptions of identical components will not be repeated.

First Embodiment

FIG. 1 shows the overall configuration of a rotating electric machine system which includes a field coil type rotating electric machine 30 according to the first embodiment.

As shown in FIG. 1, the rotating electric machine system further includes a DC power supply 10, an inverter 20 and a controller 40 in addition to the rotating electric machine 30.

The rotating electric machine 30 is a field coil type synchronous rotating electric machine. More particularly, in the present embodiment, the controller 40 controls the rotating electric machine 30 to function as an ISG (Integrated Starter Generator) or an MG (Motor Generator). In addition, the rotating electric machine 30, the inverter 20 and the controller 40 may be either integrated into a single drive apparatus or configured as individual components.

Figure 2:
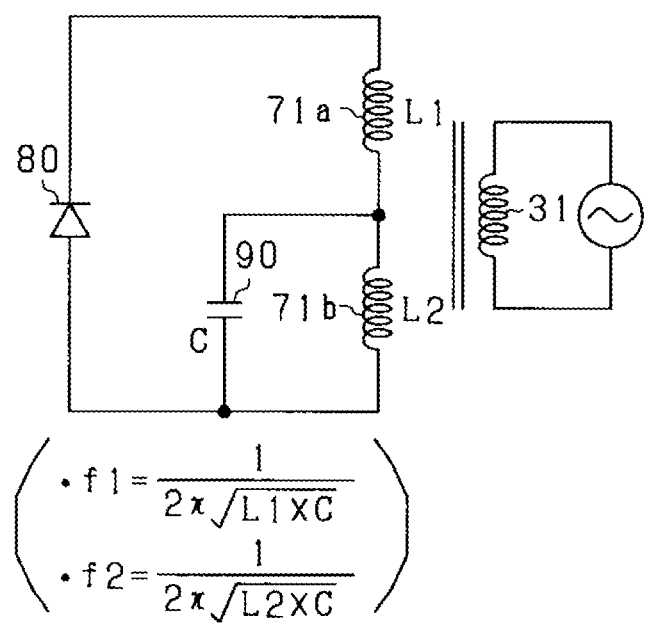
FIG. 2 is a schematic circuit diagram illustrating an electric circuit formed in a rotor of the field coil type rotating electric machine.
Figure 3:
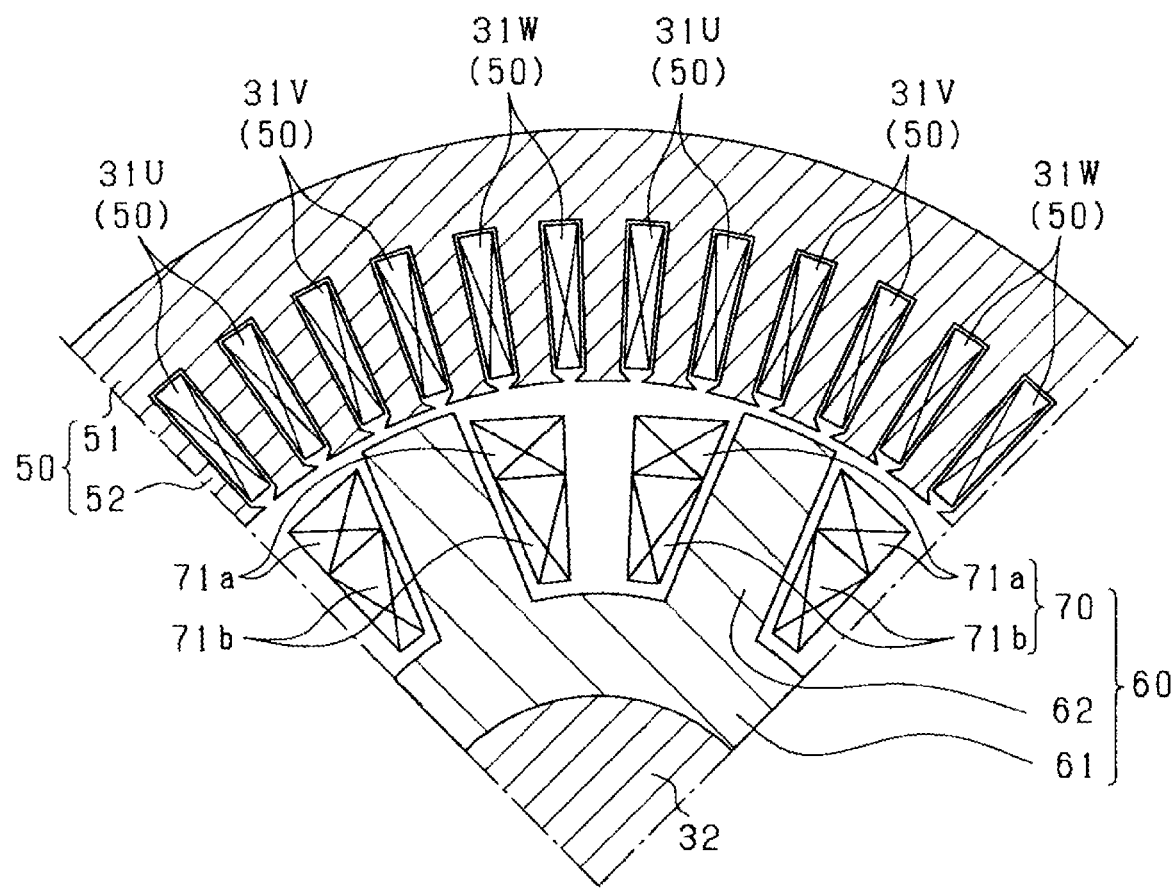
FIG. 3 is a transverse cross-sectional view of both part of the rotor and part of a stator of the field coil type rotating electric machine.

As shown in FIG. 3, the rotating electric machine 30 includes a rotor 60 having a field coil 70. In the present embodiment, as shown in FIGS. 2 and 3, the field coil 70 is constituted of a serially-connected winding pair consisting of a first winding 71a and a second winding 71b that are connected in series with each other. The field coil 70 may be formed by, for example, compression shaping to improve the space factor and the ease of assembly thereof. Moreover, the field coil 70 may be formed, for example, of aluminum wires. The specific gravity of aluminum wires is relatively low. Therefore, forming the field coil 70 with aluminum wires, it is possible to lower the centrifugal force during rotation of the rotor 60. In addition, aluminum wires are lower in both strength and hardness than copper wires. Therefore, aluminum wires are suitable for being compression-shaped.

The rotating electric machine 30 also includes a stator 50 having a stator coil 31. The stator coil 31 may be formed, for example, of copper wires. As shown in FIGS. 1 and 3, the stator coil 31 is comprised of a U-phase winding 31U, a V-phase winding 31V and a W-phase winding 31W, which are arranged to be offset from each other by 120° in electrical angle.

As shown in FIG. 1, the inverter 20 includes a serially-connected U-phase switch pair consisting of a U-phase upper-arm switch SUp and a U-phase lower-arm switch SUn, a serially-connected V-phase switch pair consisting of a V-phase upper-arm switch SVp and a V-phase lower-arm switch SVn, and a serially-connected W-phase switch pair consisting of a W-phase upper-arm switch SWp and a W-phase lower-arm switch SWn.

To a junction point between the U-phase upper-arm and lower-arm switches SUp and SUn, there is connected a first end of the U-phase winding 31U of the stator coil 31. To a junction point between the V-phase upper-arm and lower-arm switches SVp and SVn, there is connected a first end of the V-phase winding 31V of the stator coil 31. To a junction point between the W-phase upper-arm and lower-arm switches SWp and SWn, there is connected a first end of the W-phase winding 31W of the stator coil 31. A second end of the U-phase winding 31U, a second end of the V-phase winding 31V and a second end of the W-phase winding 31W are connected together to define a neutral point therebetween. That is, in the present embodiment, the U-phase, V-phase and W-phase windings 31U, 31V and 31W of the stator coil 31 are star-connected.

In addition, in the present embodiment, each of the switches SUp, SVp, SWp, SUn, SVn and SWn is implemented by an IGBT (Insulated-Gate Bipolar Transistor). Moreover, each of the switches SUp, SVp, SWp, SUn, SVn and SWn has a freewheeling diode connected in antiparallel thereto.

Each of the U-phase, V-phase and W-phase upper-arm switches SUp, SVp and SWp has its collector connected to a positive terminal of the DC power supply 10. Each of the U-phase, V-phase and W-phase lower-arm switches SUn, SVn and SWn has its emitter connected to a negative terminal of the DC power supply 10. In addition, a smoothing capacitor 11 is connected in parallel with the DC power supply 10.

The rotating electric machine system further includes an angle detection unit 41. The angle detection unit 41 is configured to output an angle signal indicative of a rotation angle of the rotor 60 of the rotating electric machine 30. The angle signal outputted from the angle detection unit 41 is inputted to the controller 40.

Next, the configuration of the stator 50 and the rotor 60 of the rotating electric machine 30 will be described in detail with reference to FIGS. 2 and 3.

As shown in FIG. 3, both the stator 50 and the rotor 60 are arranged coaxially with a rotating shaft 32. Hereinafter, the direction in which a central axis of the rotating shaft 32 extends will be referred to as the axial direction; the directions of extending radially from the central axis of the rotating shaft 32 will be referred to as radial directions; and the direction of extending along a circle whose center is on the central axis of the rotating shaft 32 will be referred to as the circumferential direction.

The stator 50 is formed by laminating a plurality of soft-magnetic steel sheets in the axial direction. The stator 50 includes an annular stator core 51 and a plurality of stator teeth 52 arranged in alignment with each other in the circumferential direction and each protruding radially inward from the stator core 51. Between each circumferentially-adjacent pair of the stator teeth 52, there is formed one slot. More particularly, in the present embodiment, the stator 50 has a total of 48 stator teeth 52 formed at equal intervals in the circumferential direction; accordingly, the number of the slots is also equal to 48. In addition, each of the U-phase, V-phase and W-phase windings 31U, 31V and 31W of the stator coil 31 is wound on the stator teeth 52 in a distributed winding manner or a concentrated winding manner.

The rotor 60 is also formed by laminating a plurality of soft-magnetic steel sheets in the axial direction. The rotor 60 includes a cylindrical rotor core 61 and a plurality of main poles 62 arranged in alignment with each other in the circumferential direction and each protruding radially outward from the rotor core 61 (i.e., each radially protruding from the rotor core 61 toward the stator 50 side). Distal end surfaces (or radially outer end surfaces) of the main poles 62 radially face distal end surfaces (or radially inner end surfaces) of the stator teeth 52. More particularly, in the present embodiment, the rotor 60 has a total of eight main poles 62 formed at equal intervals in the circumferential direction.

On each of the main poles 62 of the rotor 60, the first winding 71a of the field coil 70 is wound on the radially outer side (i.e., the stator side) while the second winding 71b of the field coil 70 is wound on the radially inner side (i.e., the non-stator side). That is, the first winding 71a is located closer to the stator 50 (i.e., more radially outward) than the second winding 71b is. Moreover, on each of the main poles 62, the first and second windings 71a and 71b are wound in the same direction. Furthermore, for each circumferentially-adjacent pair of the main poles 62, the winding direction of the first and second windings 71a and 71b on one of the main poles 62 of the circumferentially-adjacent pair is opposite to the winding direction of the first and second windings 71a and 71b on the other of the main poles 62 of the circumferentially-adjacent pair. Consequently, the magnetization directions of the main poles 62 of the circumferentially-adjacent pair are opposite to each other.

FIG. 2 shows an electric circuit formed in the rotor 60 that has the first and second windings 71a and 71b of the field coil 70 wound on the same main poles 62. In the rotor 60, there are provided a diode 80 as a rectifying element and a capacitor 90. A first end of the first winding 71a (or the first-winding-side end of the serially-connected winding pair) is connected with the cathode of the diode 80. A second end of the first winding 71a is connected with a first end of the second winding 71b. A second end of the second winding 71b (i.e., the second-winding-side end of the serially-connected winding pair) is connected with the anode of the diode 80. The capacitor 90 is connected in parallel with the second winding 71b. In addition, in FIG. 2, L1 represents the inductance of the first winding 71a; L2 represents the inductance of the second winding 71b; and C represents the capacitance of the capacitor 90.

Next, the controller 40 will be described in detail. It should be noted that part or the whole of each function of the controller 40 may be realized either by hardware such as one or more integrated circuits or by software stored in a non-transitory tangible storage medium and a computer executing the software.

The controller 40 acquires the angle signal outputted from the angle detection unit 41. Then, based on the acquired angle signal, the controller 40 generates drive signals for turning on/off the switches SUp, SVp, SWp, SUn, SVn and SWn of the inverter 20.

Specifically, when driving the rotating electric machine 30 to function as an electric motor, to convert DC power outputted from the DC power supply 10 into AC power and supply the resultant AC power to the U-phase, V-phase and W-phase windings 31U, 31V and 31W of the stator coil 31, the controller 40 generates drive signals for turning on/off the switches SUp, SVp, SWp, SUn, SVn and SWn and outputs the generated drive signals to the gates of the switches SUp, SVp, SWp, SUn, SVn and SWn. Moreover, when driving the rotating electric machine 30 to function as an electric generator, to convert AC power outputted from the U-phase, V-phase and W-phase windings 31U, 31V and 31W of the stator coil 31 into DC power and supply the resultant DC power to the DC power supply 10, the controller 40 generates drive signals for turning on/off the switches SUp, SVp, SWp, SUn, SVn and SWn and outputs the generated drive signals to the gates of the switches SUp, SVp, SWp, SUn, SVn and SWn.

Figure 4:
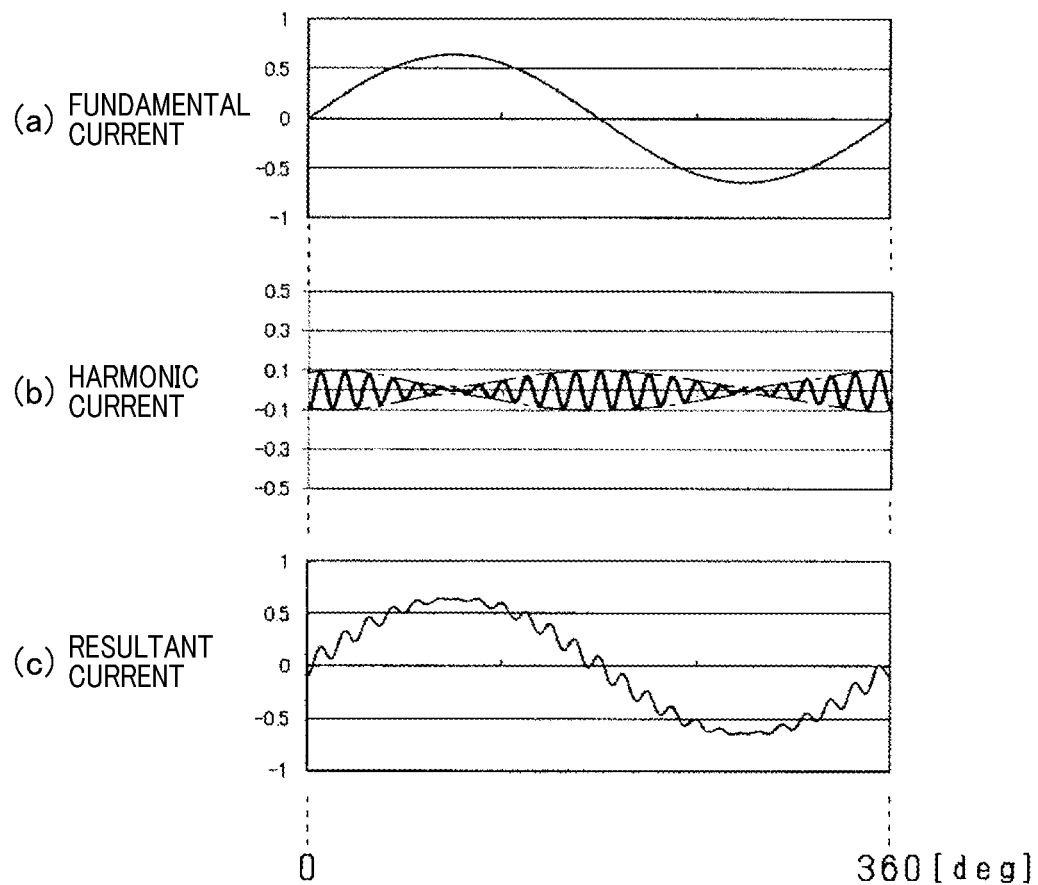
FIG. 4 is a waveform chart illustrating the waveforms of fundamental current, harmonic current and resultant current supplied to each phase winding of a stator coil of the stator according to the first embodiment.

In the present embodiment, the controller 40 turns on/off the switches SUp, SVp, SWp, SUn, SVn and SWn of the inverter 20 to supply each of the U-phase, V-phase and W-phase windings 31U, 31V and 31W of the stator coil 31 with resultant current which is the resultant of fundamental current and harmonic current. As shown in FIG. 4 (a), the fundamental current is electric current mainly for causing the rotating electric machine 30 to generate torque. As shown in FIG. 4 (b), the harmonic current is electric current mainly for exciting the field coil 70. As shown in FIG. 4 (c), the resultant current is the resultant of the fundamental current and the harmonic current and supplied as phase current to each of the U-phase, V-phase and W-phase windings 31U, 31V and 31W of the stator coil 31. In addition, the vertical axis in FIG. 4 is graduated to indicate the relationship in magnitude between the fundamental current, the harmonic current and the resultant current.

Figure 5:
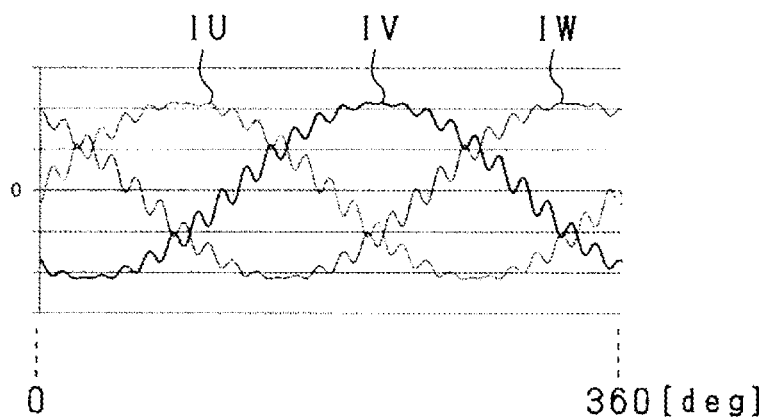
FIG. 5 is a waveform chart illustrating the waveform of three-phase alternating current supplied to the stator coil according to the first embodiment.

As shown in FIG. 5, U-phase, V-phase and W-phase currents IU, IV and IW, which are supplied respectively to the U-phase, V-phase and W-phase windings 31U, 31V and 31W of the stator coil 31, are offset in phase from each other by 120° in electrical angle.

In the present embodiment, as shown in FIGS. 4 (a) and (b), the period of the envelope of the harmonic current is set to be ½ of the period of the fundamental current. The envelope of the harmonic current is designated by a one-dot chain line in FIG. 4 (b). Moreover, the timings at which the envelope of the harmonic current reaches its peak values are offset from the timings at which the fundamental current reaches its peak values. More specifically, the timings at which the envelope of the harmonic current reaches its peak values coincide with the timings at which the fundamental current reaches its center of variation (i.e., 0). The controller 40 controls the amplitude and period of each of the fundamental current and the harmonic current severally.

By superimposing the harmonic current shown in FIG. 4 (b) on the fundamental current shown in FIG. 4 (a), it is possible to suppress increase in the maximum values of the phase currents flowing respectively in the U-phase, V-phase and W-phase windings 31U, 31V and 31W of the stator coil 31 and thus possible to bring the torque of the rotating electric machine 30 into agreement with a command torque without increasing the capacity of the inverter 20.

Figure 6:
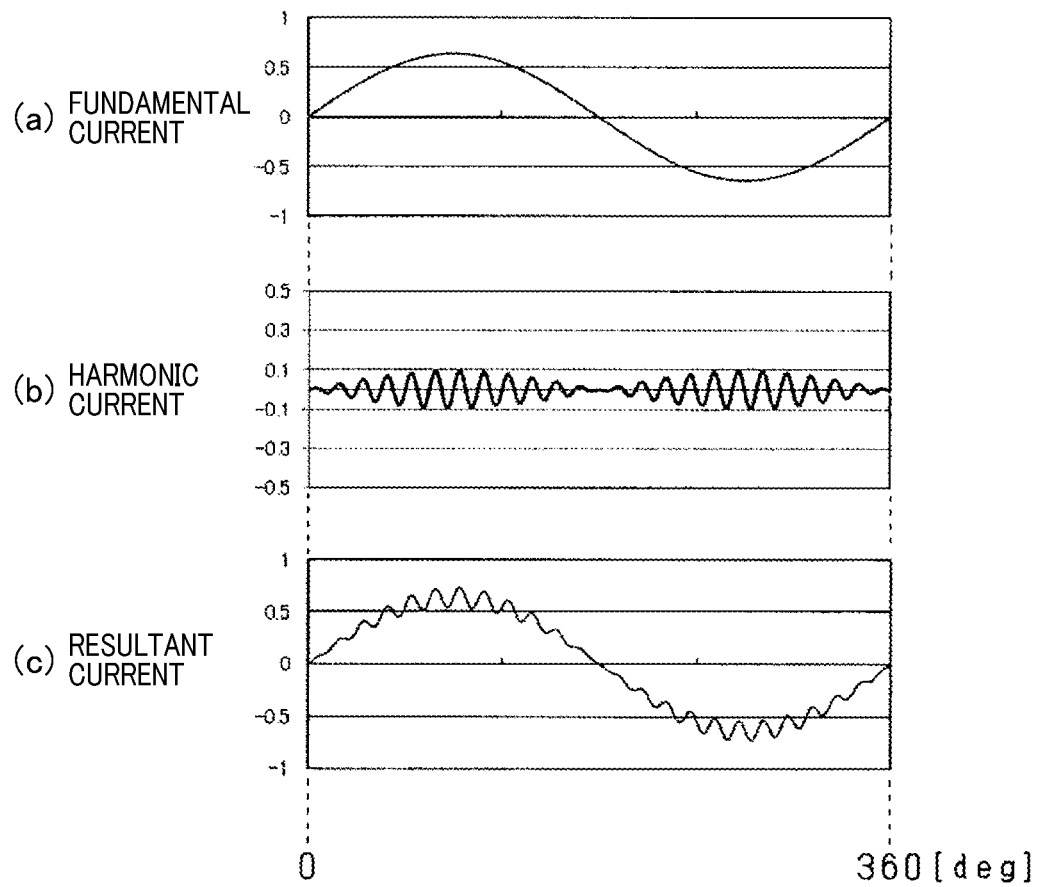
FIG. 6 is a waveform chart illustrating the waveforms of fundamental current, harmonic current and resultant current supplied to each phase winding of the stator coil according to a modification.
Figure 7:
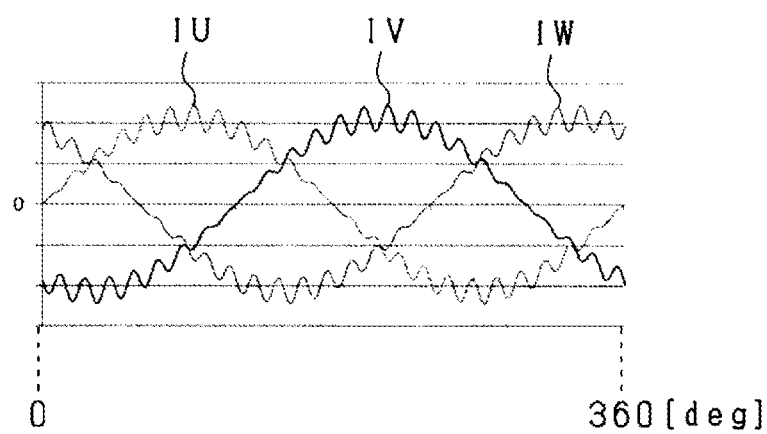
FIG. 7 is a waveform chart illustrating the waveform of three-phase alternating current supplied to the stator coil according to the modification shown in FIG. 6.

As an alternative, harmonic current shown in FIG. 6 (b) may be applied instead of the harmonic current shown in FIG. 4 (b). The fundamental current shown in FIG. 6 (a) is identical to the fundamental current shown in FIG. 4 (a). The harmonic current shown in FIG. 6 (b) is offset in phase from the harmonic current shown in FIG. 4 (b) by ¼ of the period of the fundamental current. The resultant current shown in FIG. 6 (c) is the resultant of the fundamental current shown in FIG. 6 (a) and the harmonic current shown in FIG. 6 (b). In this case, as shown in FIG. 6 (a) (b), the timings at which the envelope of the harmonic current reaches its peak values coincide with the timings at which the fundamental current reaches its peak values. Moreover, in this case, the U-phase, V-phase and W-phase currents IU, IV and IW, which are supplied respectively to the U-phase, V-phase and W-phase windings 31U, 31V and 31W of the stator coil 31, are as shown in FIG. 7.

In the present embodiment, the first winding 71a of the field coil 70, the capacitor 90 and the diode 80 together form a series resonant circuit. The series resonant circuit has a resonance frequency which will be referred to as the first resonance frequency f1 hereinafter. The first resonance frequency f1 can be calculated based on the inductance L1 of the first winding 71a and the capacitance C of the capacitor 90 by the following equation (eq1). Moreover, the second winding 71b of the field coil 70 and the capacitor 90 together form a parallel resonant circuit. The parallel resonant circuit has a resonance frequency which will be referred to as the second resonance frequency f2 hereinafter. The second resonance frequency f2 can be calculated based on the inductance L2 of the second winding 71b and the capacitance C of the capacitor 90 by the following equation (eq2).

$$f1 = \frac{1}{2\pi\sqrt{L1 \cdot C}} \tag{eq 1}$$

$$f2 = \frac{1}{2\pi\sqrt{L2 \cdot C}} \tag{eq 2}$$

Upon the harmonic current flowing in each of the U-phase, V-phase and W-phase windings 31U, 31V and 31W of the stator coil 31, the main magnetic flux varies due to harmonics; the main magnetic flux flows through a magnetic circuit that includes the main poles 62 circumferentially adjacent to one another, the rotor core 61, the stator teeth 52 and the stator core 51. With the variation in the main magnetic flux, voltages are induced respectively in the first and second windings 71a and 71b of the field coil 70, thereby inducing electric currents respectively in the first and second windings 71a and 71b. Moreover, when the voltages induced respectively in the first and second windings 71a and 71b are of the same polarity as in the patterns 1 and 4 shown in FIG. 8, the electric currents induced respectively in the first and second windings 71a and 71b are not cancelled by each other, thus increasing the total electric current induced in the field coil 70. Furthermore, the electric currents induced respectively in the first and second windings 71a and 71b are rectified by the diode 80 to flow in one direction, namely the rectification direction. Consequently, field current flows in the field coil 70 in the rectification direction, thereby exciting the field coil 70. In addition, in FIG. 8, e1 represents the voltage induced in the first winding 71a; and e2 represents the voltage induced in the second winding 71b.

On the other hand, upon the harmonic current flowing in each of the U-phase, V-phase and W-phase windings 31U, 31V and 31W of the stator coil 31, leakage magnetic flux is also generated in addition to the main magnetic flux. The leakage magnetic flux flows between each circumferentially-adjacent pair of the main poles 62 without flowing through the rotor core 61, crossing the field coil 70. Upon the leakage magnetic flux crossing the field coil 70, the voltages induced respectively in the first and second windings 71a and 71b of the field coil 70 may become opposite in polarity to each other, thereby reducing the sum of the electric currents induced respectively in the first and second windings 71a and 71b and thus the field current flowing in the field coil 70.

To solve the above problem, in the present embodiment, the capacitor 90 is connected in parallel with the second winding 71b. Consequently, when the voltages induced respectively in the first and second windings 71a and 71b are opposite in polarity to each other as in the patterns 2 and 3 shown in FIG. 8, the electric currents induced in the first and second windings 71a and 71b flow via the capacitor 90, without being canceled by each other. More specifically, as shown in FIG. 9A, both the electric current induced in the first winding 71a and the electric current induced in the second winding 71b may flow to the anode of the diode 80 via the capacitor 90. Otherwise, as shown in FIG. 9B, electric current may flow from the capacitor 90 to the anode of the diode 80 via the second winding 71b. As a result, it becomes possible to increase the field current flowing in the field coil 70.

Moreover, in the present embodiment, the frequency fh of the harmonic currents supplied to the phase windings 31U-31W of the stator coil 31 is set to be equal or close to the first resonance frequency f1. Consequently, it becomes possible to further increase the sum of the electric currents induced respectively in the first and second windings 71a and 71b and thus the field current flowing in the field coil 70.

A further investigation of the patterns 2 and 3 shown in FIG. 8 has been performed by the inventor of the present application. The results of the investigation will be described hereinafter.

Figure 10:
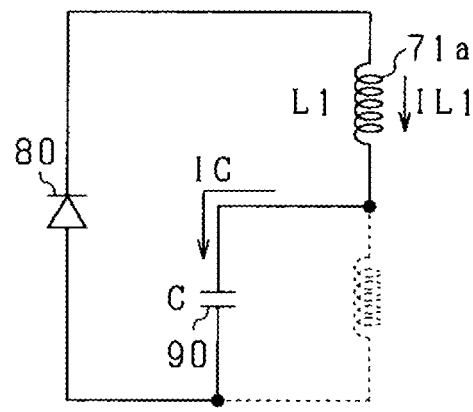
FIG. 10 is a schematic circuit diagram illustrating a series resonant circuit formed in the field coil type rotating electric machine.
Figure 11:
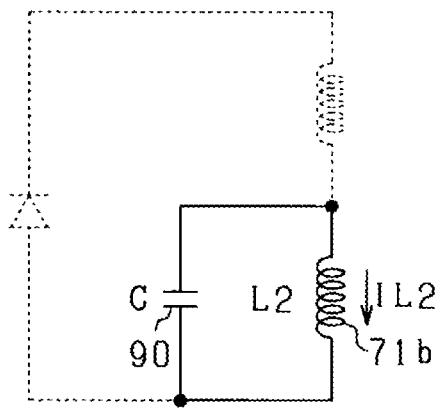
FIG. 11 is a schematic circuit diagram illustrating a parallel resonant circuit formed in the field coil type rotating electric machine.
Figure 12:
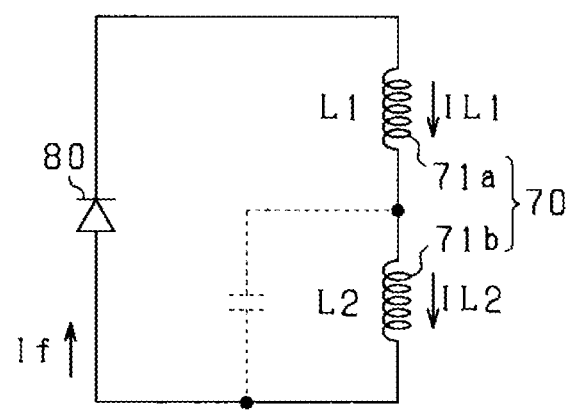
FIG. 12 is a schematic circuit diagram illustrating a rectification circuit formed in the field coil type rotating electric machine.

The electric circuit shown in FIG. 2 basically includes three sub-circuits as shown in FIGS. 10-12. The sub-circuit shown in FIG. 10 is the series resonant circuit that is formed of the first winding 71a, the capacitor 90 and the diode 80. The sub-circuit shown in FIG. 11 is the parallel resonant circuit that is formed of the second winding 71b and the capacitor 90. The sub-circuit shown in FIG. 12 is a rectification circuit of the field current, which is formed of the first winding 71a, the second winding 71b and the diode 80.

In the series resonant circuit shown in FIG. 10, at the first resonance frequency f1, the impedance becomes lowest and the alternating current becomes highest. Moreover, due to the diode 80 included in the series resonant circuit, half-wave current flows in the series resonant circuit. On the other hand, in the parallel resonant circuit shown in FIG. 11, at the second resonance frequency f2, the impedance becomes lowest and the alternating current becomes highest.

When the frequency fh of the harmonic currents supplied to the phase windings 31U-31W of the stator coil 31 is equal to the first resonance frequency f1, in the series resonant circuit, electric current varying at the first resonance frequency f1 is supplied to the capacitor 90. The electric current supplied to the capacitor 90 is then half-wave rectified by the diode 80 into the half-wave current. In addition, in the series resonant circuit, the electric current, which is blocked by the diode 80, returns to the anode of the diode 80 via the second winding 71b included in the parallel resonant circuit.

Moreover, when the first resonance frequency f1 and the second resonance frequency f2 are equal or close to each other, the alternating currents flowing respectively in the series resonant circuit and the parallel resonant circuit take maximum values or values close to the maximum values.

In the rectification circuit shown in FIG. 12, the total impedance of the first and second windings 71a and 71b becomes very high in the vicinity of the first resonance frequency f1. Therefore, the electric current flowing in the rectification circuit shown in FIG. 12 is constituted mainly of the alternating currents flowing respectively in the series resonant circuit shown in FIG. 10 and the parallel resonant circuit shown in FIG. 11. Moreover, the electric current flowing in the rectification circuit shown in FIG. 12 is rectified by the diode 80 into direct current.

Figure 13:
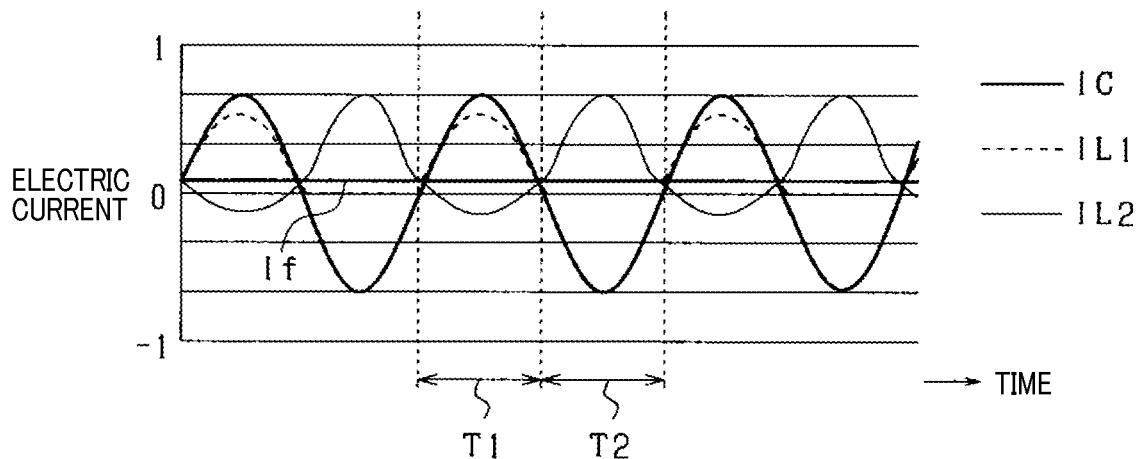
FIG. 13 is a time chart illustrating the changes with time of electric currents flowing in the circuits shown in FIGS. 10-12.
Figure 14:
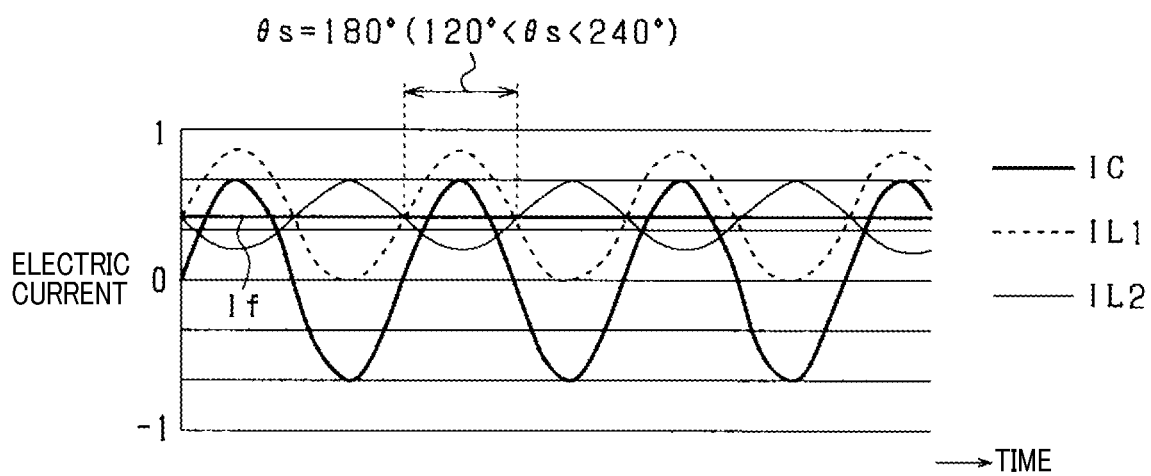
FIG. 14 is another time chart illustrating the changes with time of the electric currents flowing in the circuits shown in FIGS. 10-12.

FIGS. 13 and 14 illustrate the changes with time of the electric currents flowing in the circuits shown in FIGS. 10-12. Specifically, in FIGS. 13 and 14, IC represents the capacitor current flowing through the capacitor 90; IL1 represents the electric current flowing through the first winding 71a; IL2 represents the electric current flowing through the second winding 71b; and If represents the field current which is the direct current flowing in the rectification circuit shown in FIG. 12. In addition, the vertical axes in FIGS. 13 and 14 are graduated to indicate the relationship in magnitude between IC, IL1, IL2 and If.

In the present embodiment, the capacitor current IC is defined to be positive when it flows in a direction from the first winding 71a to the capacitor 90 as indicated by an arrow in FIG. 10. The electric current IL1 flowing through the first winding 71a is defined to be positive when it flows in a direction from the first end of the first winding 71a to the second end of the same as indicated by another arrow in FIG. 10. The electric current IL2 flowing through the second winding 71b is defined to be positive when it flows in a direction from the first end of the second winding 71b to the second end of the same as indicated by an arrow in FIG. 11. The field current If is defined to be positive when it flows in a direction from the anode to the cathode of the diode 80 as indicated by an arrow in FIG. 12.

In FIG. 13, there are illustrated the changes with time of IC, IL1, IL2 and If immediately after the start of excitation of the field coil 70. During a first time period T1 shown in FIG. 13, the capacitor current IC is positive. That is, during the first time period T1, electric current flows from the first winding 71a to the capacitor 90 in the series resonant circuit shown in FIG. 10. The amplitude of the positive capacitor current IC is substantially equal to the amplitude of the positive electric current IL1 flowing through the first winding 71a. Setting the frequency fh of the harmonic currents supplied to the phase windings 31U-31W of the stator coil 31 to be equal to the first resonance frequency f1, the alternating current flowing in the series resonant circuit is increased.

On the other hand, in a second time period T2 adjacent in time to the first time period T1 in FIG. 13, the capacitor current IC is negative. That is, during the second time period T2, electric current flows from the capacitor 90 to the second winding 71b in the parallel resonant circuit shown in FIG. 11. The amplitude of the negative capacitor current IC is substantially equal to the amplitude of the positive electric current IL2 flowing through the second winding 71b.

Figure 15:
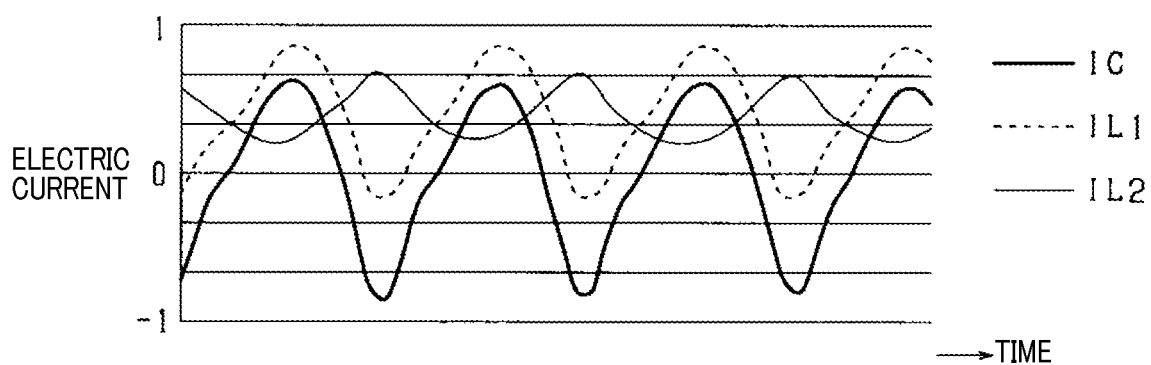
FIG. 15 is a time chart showing the results of a real-machine simulation which include the changes with time of the electric currents flowing in the circuits shown in FIGS. 10-12.

With repetition of the state of the electric currents in the first time period T1 and the state of the electric currents in the second time period T2, the field current If is increased as shown in FIG. 14. In addition, FIG. 15 shows the results of a simulation performed with a real-machine model.

In the present embodiment, as shown in FIG. 14, the phase offset θs between the electric current IL1 flowing through the first winding 71a and the electric current IL2 flowing through the second winding 71b is set to 180° in electrical angle. Consequently, the ripple of the magnetic field created by the electric current IL1 flowing through the first winding 71a and the ripple of the magnetic field created by the electric current IL2 flowing through the second winding 71b can be canceled by each other, making the resultant magnetic field constant. Here, the resultant magnetic field denotes the resultant of the magnetic field created by the electric current IL1 flowing through the first winding 71a and the magnetic field created by the electric current IL2 flowing through the second winding 71b.

In addition, the phase offset θs may alternatively be set to any value other than 180° in the range of (120°<θs<240°). Setting the phase offset θs to be in the above range, it is possible to reduce the ripple of the resultant magnetic field and thus the ripple of the torque of the rotating electric machine 30.

Moreover, for setting the phase offset θs to be in the above range, in the present embodiment, the inductances L1 and L2 of the first and second windings 71a and 71b are set to satisfy the following mathematical expressions (eq3) and (eq4). Hereinafter, the setting of the inductances L1 and L2 of the first and second windings 71a and 71b will be described in detail.

$$\frac{1}{(1+B)^2} < \frac{L2}{L1} < \frac{1}{(1-A)^2} \quad (eq3)$$

$$\frac{1}{(1+B)^2} < \frac{L1}{L2} < \frac{1}{(1-A)^2} \quad (eq4)$$

Figure 16:
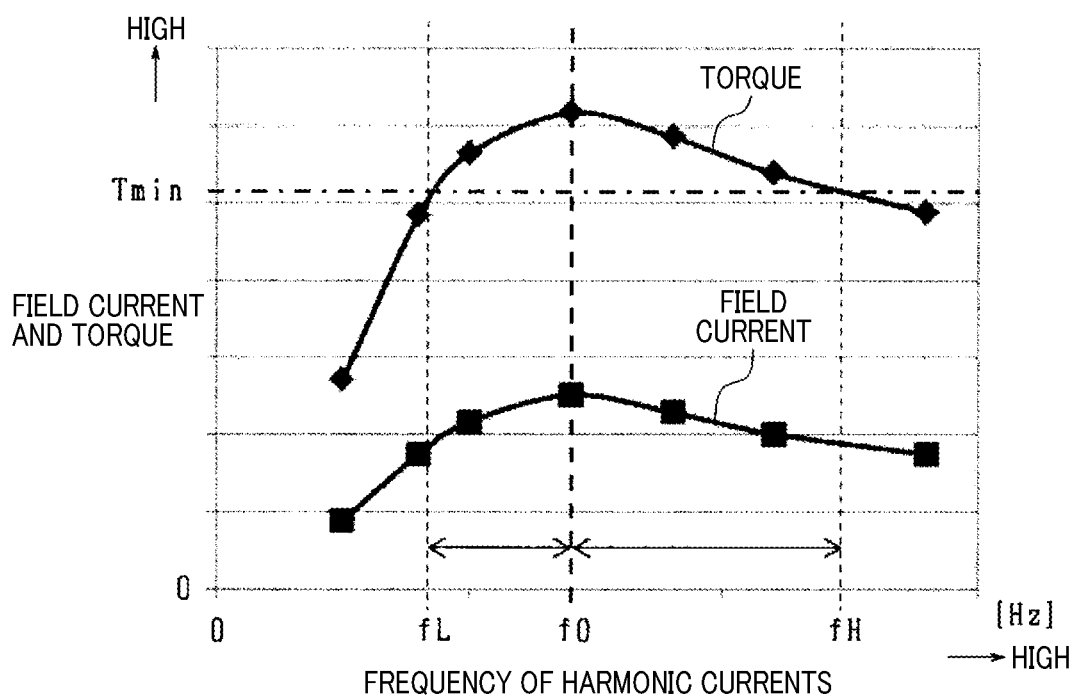
FIG. 16 is a characteristic diagram illustrating the relationship between the frequency of the harmonic currents supplied to the phase windings of the stator coil, field current flowing in the field coil and the torque of the field coil type rotating electric machine.

FIG. 16 illustrates the relationship between the frequency fh of the harmonic currents supplied to the phase windings 31U-31W of the stator coil 31, the field current If flowing in the field coil 70 and the torque of the rotating electric machine 30.

As seen from FIG. 16, the torque of the rotating electric machine 30 becomes highest at a value of the frequency fh within a given range where the frequency fh is set in practice. Hereinafter, the value of the frequency fh at which the torque of the rotating electric machine 30 becomes highest will be referred to as the reference frequency f0. Moreover, the reference frequency f0 is a frequency at which the first resonance frequency f1 and the second resonance frequency f2 are equal to each other. As the frequency fh of the harmonic currents deviates from the reference frequency f0, the field current If is decreased and thus the torque of the rotating electric machine 30 is lowered. In addition, the torque of the rotating electric machine 30 is lowered with decrease in the field current If.

That is, the rotating electric machine 30 has a characteristic such that the field current If and thus the torque of the rotating electric machine 30 increase as the frequency fh of the harmonic currents approaches the reference frequency f0 that is equal to the first resonance frequency f1 in the present embodiment.

Furthermore, the torque of the rotating electric machine 30 is required to be higher than or equal to an allowable lower limit Tmin. The allowable lower limit Tmin may be set to be, for example, 80%-90% of the maximum torque of the rotating electric machine 30. Moreover, as seen from FIG. 16, there are two values of the frequency fh at which the torque of the rotating electric machine 30 becomes equal to the allowable lower limit Tmin. Hereinafter, the lower one of the two values of the frequency fh will be referred to as the lower limit frequency fL whereas the higher one of the two values of the frequency fh will be referred to as the upper limit frequency fH. The lower limit frequency fL and the upper limit frequency fH can be expressed by the following mathematical expression (eq5), where A and B are predetermined real numbers. In the present embodiment, A is predetermined to be equal to 0.3 (i.e., 30%) and B is predetermined to be equal to 0.4 (i.e., 40%).

$$\left. \begin{array}{l} fL = (1-A)f0, \quad 0 < A < 1 \\ fH = (1+B)f0, \quad 0 < B < 1 \end{array} \right\} \quad (eq5)$$

In the above mathematical expression (eq5), the real numbers A and B may be predetermined in the ranges of, for example, (0<A≤0.5) and (0<B≤0.5). It is preferable that: 0<A≤0.4; and 0<B≤0.4. Moreover, it is also preferable for each of the first resonance frequency f1 and the second resonance frequency f2 to be higher than the lower limit frequency fL and lower than the upper limit frequency fH. Accordingly, the following mathematical expressions (eq6) and (eq7) can be derived.

$$(1-A)f0 < f1 < (1+B)f0. \quad (eq6)$$

$$(1-A)f0 < f2 < (1+B)f0. \quad (eq7)$$

Moreover, from the above mathematical expression (eq6) and equation (eq1), the following mathematical expression (eq8) can be derived.

$$(1-A)f0 < \frac{1}{2\pi\sqrt{L1 \cdot C}} < (1+B)f0 \quad (eq8)$$

$$\to (1-A)^2 f0^2 < \frac{1}{(2\pi)^2 L1 \cdot C} < (1+B)^2 f0^2$$

Further, using the following equation (eq9), the above mathematical expression (eq8) can be rewritten into the following mathematical expression (eq10).

$$K = \frac{1}{f0^2 (2\pi)^2 C} \quad (eq9)$$

$$(1-A)^2 < \frac{K}{L1} < (1+B)^2 \quad (eq10)$$

Furthermore, the following mathematical expression (eq11) can be derived by rewriting the above mathematical expression (eq10) for L1.

$$\frac{K}{(1+B)^2} < L1 < \frac{K}{(1-A)^2} \quad (eq11)$$

On the other hand, from the above mathematical expression (eq7) and equation (eq2), the following mathematical expression (eq12) can be derived.

$$(1-A)f0 < \frac{1}{2\pi\sqrt{L2 \cdot C}} < (1+B)f0 \quad (eq12)$$

$$\rightarrow (1-A)^2 f0^2 < \frac{1}{(2\pi)^2 L2 \cdot C} < (1+B)^2 f0^2$$

Further, similar to the above mathematical expression (eq11), the following mathematical expression (eq13) can be derived from the above mathematical expression (eq12) using the equation (eq9).

$$\frac{K}{(1+B)^2} < L2 < \frac{K}{(1-A)^2} \quad (eq13)$$

Moreover, the following equation (eq14) can be derived from the condition that the first resonance frequency f1 is equal to the reference frequency f0. In this case, L1=K.

$$f0 = f1 = \frac{1}{2\pi\sqrt{L1 \cdot C}} \quad (eq14)$$

$$\rightarrow L1 = \frac{1}{f0^2 (2\pi)^2 C} = K$$

Substituting (K=L1) into the above mathematical expression (eq13), the above mathematical expression (eq3) can be obtained.

On the other hand, the following equation (eq15) can be derived from the condition that the second resonance frequency f2 is equal to the reference frequency f0. In this case, L2=K.

$$f0 = f2 = \frac{1}{2\pi\sqrt{L2 \cdot C}} \quad (eq15)$$

$$\rightarrow L2 = \frac{1}{f0^2 (2\pi)^2 C} = K$$

Substituting (K=L2) into the above mathematical expression (eq11), the above mathematical expression (eq4) can be obtained.

As described above, in the present embodiment, A and B are predetermined such that A=0.3 and B=0.4. In this case, the above mathematical expression (eq3) is reduced to (0.5<L2/L1<2); and the above mathematical expression (eq4) is reduced to (0.5<L1/L2<2).

Moreover, the inductance L1 of the first winding 71a and the inductance L2 of the second winding 71b may be set to be equal to each other (i.e., L1=L2). In this case, the first resonance frequency f1 and the second resonance frequency f2 become equal to each other (i.e., f1=f2), thereby effectively increasing the field current If.

Alternatively, the inductance L1 of the first winding 71a and the inductance L2 of the second winding 71b may be set to be different from each other (i.e., L1 L2) on the condition that (0.5<L2/L1<2) and (0.5<L1/L2<2). Hereinafter, specific examples will be given of setting L1 and L2 to be different from each other.

First Example

When f1>f2, (L2>L1) can be derived from the above equations (eq1) and (eq2). In this case, the following mathematical expression (eq16) is satisfied.

$$\frac{L2}{L1} > 1, \frac{L1}{L2} < 1 \quad (eq16)$$

Moreover, when both A and B are set to 0.2 (i.e., A=0.2 and B=0.2), (1<L2/L1<1.56) and (0.69<L1/L2<1) can be derived from the above mathematical expressions (eq3), (eq4) and (eq16). In addition, the setting of (A=0.2 and B=0.2) corresponds to the case of setting the allowable lower limit Tmin to be 90% of the maximum torque of the rotating electric machine 30.

Second Example

When f2>f1, (L1>L2) can be derived from the above equations (eq1) and (eq2). In this case, the following mathematical expression (eq17) is satisfied.

$$\frac{L2}{L1} < 1, \frac{L1}{L2} > 1 \quad (eq17)$$

Moreover, when both A and B are set to 0.2 (i.e., A=0.2 and B=0.2), (0.69<L2/L1<1) and (1<L1/L2<1.56) can be derived from the above mathematical expressions (eq3), (eq4) and (eq17).

As above, setting the absolute values of A and B to be smaller, i.e., setting the frequency range of fh defined as (fL-fH) to be narrower, the ranges of L2/L1 and L1/L2 accordingly become narrower.

According to the present embodiment, it is possible to achieve the following advantageous effects.

In the present embodiment, the field type rotating electric machine 30 includes the stator 50, the field coil 70 and the rotor 60. The stator 50 includes the stator coil 31 that is comprised of the U-phase, V-phase and W-phase windings 31U, 31V and 31W. The field coil 70 includes the serially-connected winding pair consisting of the first winding 71a and the second winding 71b that are connected in series with each other. The rotor 60 includes the rotor core 61 and the main poles 62 formed at predetermined intervals in the circumferential direction and each radially protruding from the rotor core 61. Each of the first and second windings 71a and 71b of the field coil 70 is wound on all of the main poles 62 of the rotor 60. Each of the phase windings 31U-31W of the stator coil 31 is configured to be supplied with harmonic current to induce field current in the field coil 70. The rotating electric machine 30 further includes the diode 80 and the capacitor 90. The diode 80 has its cathode connected to the first-winding-side end of the serially-connected winding pair and its anode connected to the second-winding-side end of the serially-connected winding pair. The capacitor 90 is connected in parallel with the second winding 71b. In the rotating electric machine 30, there are formed both the series resonant circuit including the first winding 71a and the capacitor 90 and the parallel resonant circuit including the second winding 71b and the capacitor 90. The inductances L1 and L2 of the first and second windings 71a and 71b are set to satisfy both the mathematical expressions (eq3) and (eq4). More particularly, in the present embodiment, the inductances L1 and L2 of the first and second windings 71a and 71b are set to satisfy both the relationships of $(0.5<L2/L1<2)$ and $(0.5<L1/L2<2)$.

Setting the inductances L1 and L2 of the first and second windings 71a and 71b as above, it is possible to increase the field current If flowing in the field coil 70, thereby increasing the torque of the rotating electric machine 30.

More specifically, in the present embodiment, the rotating electric machine 30 has a characteristic such that the field current If and thus the torque of the rotating electric machine 30 become highest when the resonance frequency f1 of the series resonant circuit and the resonance frequency f2 of the parallel resonant circuit are equal to each other and the frequency fh of the harmonic currents supplied to the phase windings 31U-31W of the stator coil 31 is set to be equal to the resonance frequencies f1 and f2 of the series and parallel resonant circuits. Moreover, the reference frequency f0, the lower limit frequency fL and the upper limit frequency fH satisfy the mathematical expression (eq5); the reference frequency f0, the lower limit frequency fL and the upper limit frequency fH respectively represent the value of the frequency fh of the harmonic currents at which the torque of the rotating electric machine 30 becomes highest, the lower one of the two values of the frequency fh of the harmonic currents at which the torque of the rotating electric machine 30 becomes equal to the allowable lower limit Tmin and the higher one of the two values of the frequency fh of the harmonic currents. Furthermore, the mathematical expression (eq3) can be derived from the condition that the first resonance frequency f1 is equal to the reference frequency f0; the mathematical expression (eq4) can be derived from the condition that the second resonance frequency f2 is equal to the reference frequency f0. Further, when A=0.3 and B=0.4 (i.e., fL=0.7f0 and fH=1.4f0), the mathematical expression (eq3) is reduced to $(0.5<L2/L1<2)$ and the mathematical expression (eq4) is reduced to $(0.5<L1/L2<2)$. Therefore, setting the inductances L1 and L2 of the first and second windings 71a and 71b to satisfy both the relationships of $(0.5<L2/L1<2)$ and $(0.5<L1/L2<2)$, it is possible to increase the field current If flowing in the field coil 70, thereby increasing the torque of the rotating electric machine 30.

First Modification of First Embodiment

Each of the first and second windings 71a and 71b of the field coil 70 may be formed of a rectangular conductor wire (i.e., an electrical conductor wire having a rectangular cross-sectional shape). In this case, it is possible to improve the space factor of the field coil 70, thereby improving the efficiency of the field coil type rotating electric machine 30. Moreover, in this case, adjacent portions of the first and second windings 71a and 71b of the field coil 70 are in surface contact with each other; consequently, when the centrifugal force is applied to the windings 71a and 71b, it is possible to lower the load acting between adjacent portions of the windings 71a and 71b, thereby preventing damage to insulating coats of the windings 71a and 71b. Furthermore, in this case, it is possible to improve the ampere-turn (AT) of the field coil 70, thereby broadening the excitation range of the field coil 70. As a result, it is possible to improve the torque controllability of the field coil type rotating electric machine 30.

In addition, each of the first and second windings 71a and 71b of the field coil 70 may be constituted of an α winding of a rectangular conductor wire, such as one shown in FIG. 5(A) of Japanese Patent Application Publication No. JP 2008-178211 A.

Second Modification of First Embodiment

Figure 17:
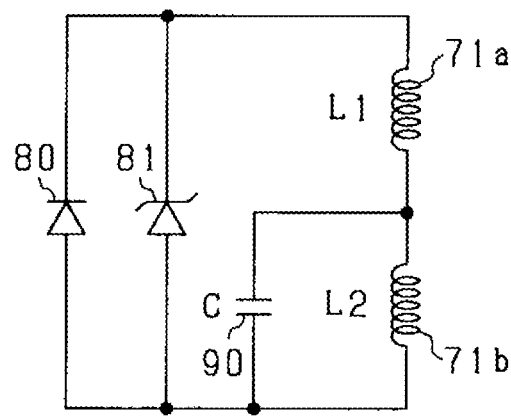
FIG. 17 is a schematic circuit diagram illustrating an electric circuit formed in a rotor according to a second modification of the first embodiment.

As shown in FIG. 17, the field coil type rotating electric machine 30 may further have a Zener diode 81 connected in parallel with the rectification diode 80. In this case, when a surge voltage is applied to the diode 80, the field coil 70 and the capacitor 90, it is possible to absorb the surge voltage with the Zener diode 81, thereby suppressing deterioration of the diode 80, the field coil 70 and the capacitor 90.

In addition, a surge voltage may be generated by, for example, large distortion of the waveforms of the harmonic currents supplied to the phase windings 31U-31W of the stator coil 31 from a sinusoidal waveform. In particular, in the case of performing 180°-rectangular-wave energization control as described in Japanese Patent Application Publication No. JP 2010-273476 A or Japanese Patent Application Publication No. JP 2018-098907 A, when pulsating voltages are superimposed on the voltages applied to the phase windings 31U-31W of the stator coil 31 for supplying harmonic currents to the phase windings 31U-31W, the waveforms of the harmonic currents may be considerably distorted, thereby generating a high surge voltage. In this case, the effect of the Zener diode 81 on suppression of the surge voltage is particularly significant.

Third Modification of First Embodiment

Figure 18:
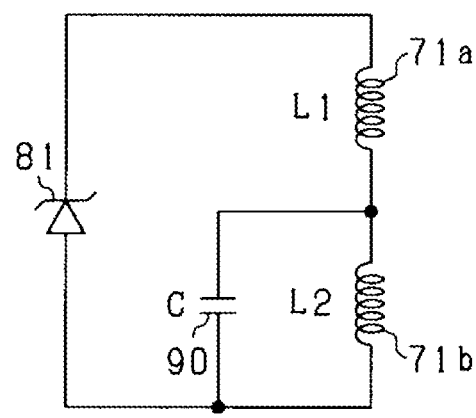
FIG. 18 is a schematic circuit diagram illustrating an electric circuit formed in a rotor according to a third modification of the first embodiment.

As shown in FIG. 18, the field coil type rotating electric machine 30 may employ a Zener diode 81 instead of the rectification diode 80. In this case, the Zerner diode 81 performs both the rectification function and the surge absorption function. Consequently, the parts count of the field coil type rotating electric machine 30 is reduced in comparison with the above-described second modification.

Figure 19:
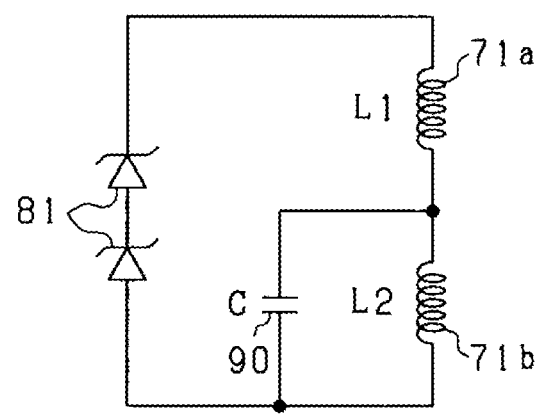
FIG. 19 is a schematic circuit diagram illustrating an electric circuit formed in another rotor according to the third modification of the first embodiment.

In addition, the field coil type rotating electric machine 30 may also include, instead of the rectification diode 80, a plurality (e.g., two as shown in FIG. 19) of Zener diodes 81 that are connected in series with each other.

Fourth Modification of First Embodiment

Figure 20:
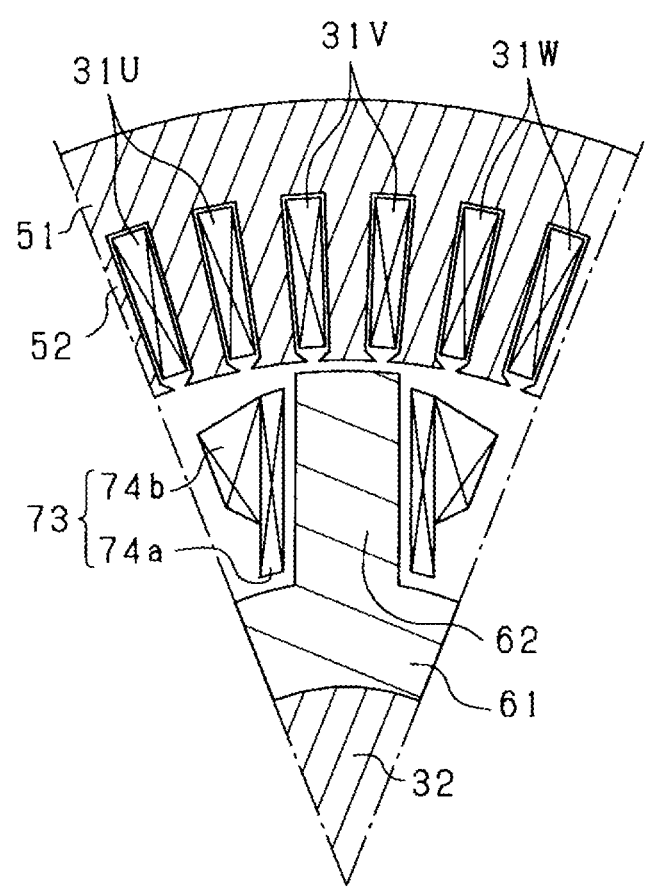
FIG. 20 is a transverse cross-sectional view of both part of a rotor and part of a stator of a field coil type rotating electric machine according to a fourth modification of the first embodiment.

The field coil type rotating electric machine 30 may employ, instead of the field coil 70, a field coil 73 as shown in FIG. 20. The field coil 73 is constituted of a first winding 74a wound on each of the main poles 62 and a second winding 74b wound on the first winding 74a. Consequently, on each of the main poles 62, the first winding 74a is wound circumferentially inside the second winding 74b.

Second Embodiment

In the present embodiment, the number of turns N1 of the first winding 71a and the number of turns N2 of the second winding 71b are set to satisfy the relationship of $(N1<N2)$.

Specifically, the inductance L1 of the first winding 71a can be expressed by the following equation (eq18) and the inductance L2 of the second winding 71*b* can be expressed by the following equation (eq19).

$$L1 = \mu \cdot N1^2 \frac{S1}{m1} \quad \text{(eq18)}$$

$$L2 = \mu \cdot N2^2 \frac{S2}{m2} \quad \text{(eq19)}$$

In the above equations (eq18) and (eq19), μ is the magnetic permeability, S1 and m1 are respectively the cross-sectional area and length of a magnetic path formed in the first winding 71*a* upon energization of the first winding 71*a*, S2 and m2 are respectively the cross-sectional area and length of a magnetic path formed in the second winding 71*b* upon energization of the second winding 71*b*.

As can be seen from the equations (eq1) and (eq2) described in the first embodiment, for setting the first resonance frequency f1 and the second resonance frequency f2 to be equal to each other (i.e., f1=f2) and thereby effectively increasing the field current If, it is necessary to set the inductance L1 of the first winding 71*a* and the inductance L2 of the second winding 71*b* to be equal to each other (i.e., L1=L2).

Moreover, as can be seen from the above equations (eq18) and (eq19), when S1/m1 is equal to S2/m2 (i.e., S1/m1=S2/m2), for setting the inductance L1 of the first winding 71*a* and the inductance L2 of the second winding 71*b* to be equal to each other (i.e., L1=L2), it is necessary to set the number of turns N1 of the first winding 71*a* and the number of turns N2 of the second winding 71*b* to be equal to each other (i.e., N1=N2). However, in practice, S1/m1 is not equal to S2/m2.

Figure 21:
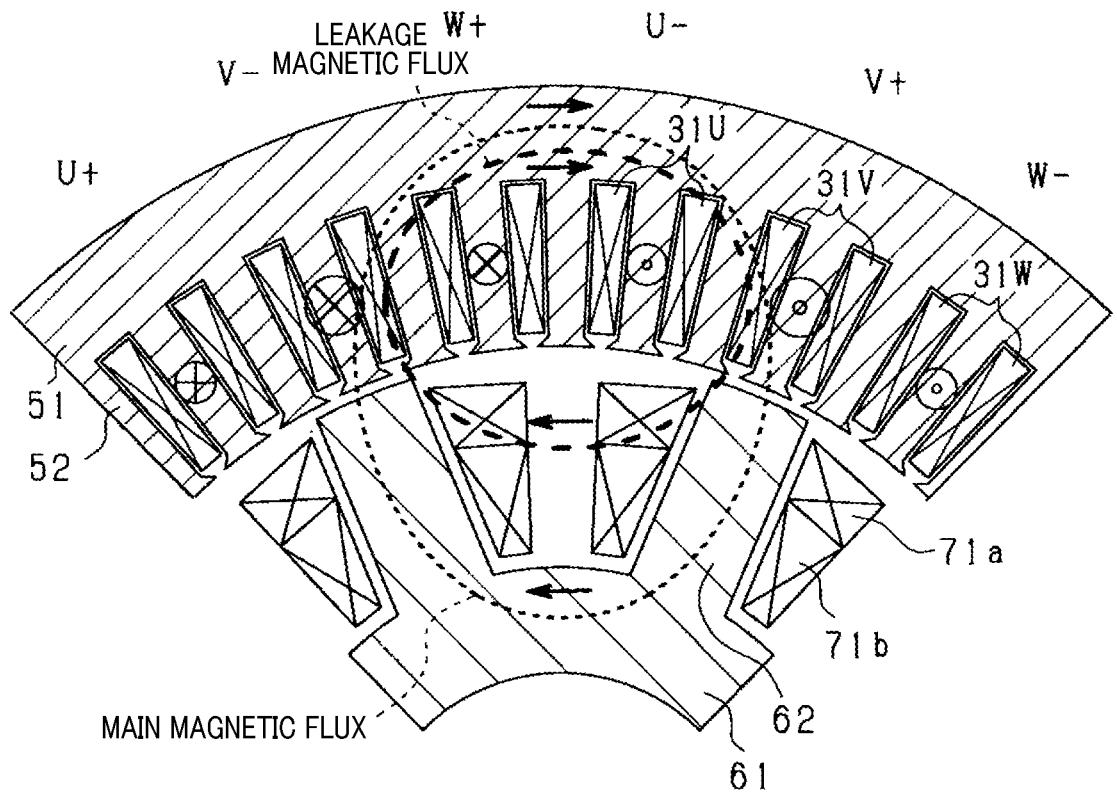
FIG. 21 is an explanatory diagram illustrating the flow of magnetic fluxes in a field coil type rotating electric machine according to a second embodiment in an almost no-load state.
Figure 22:
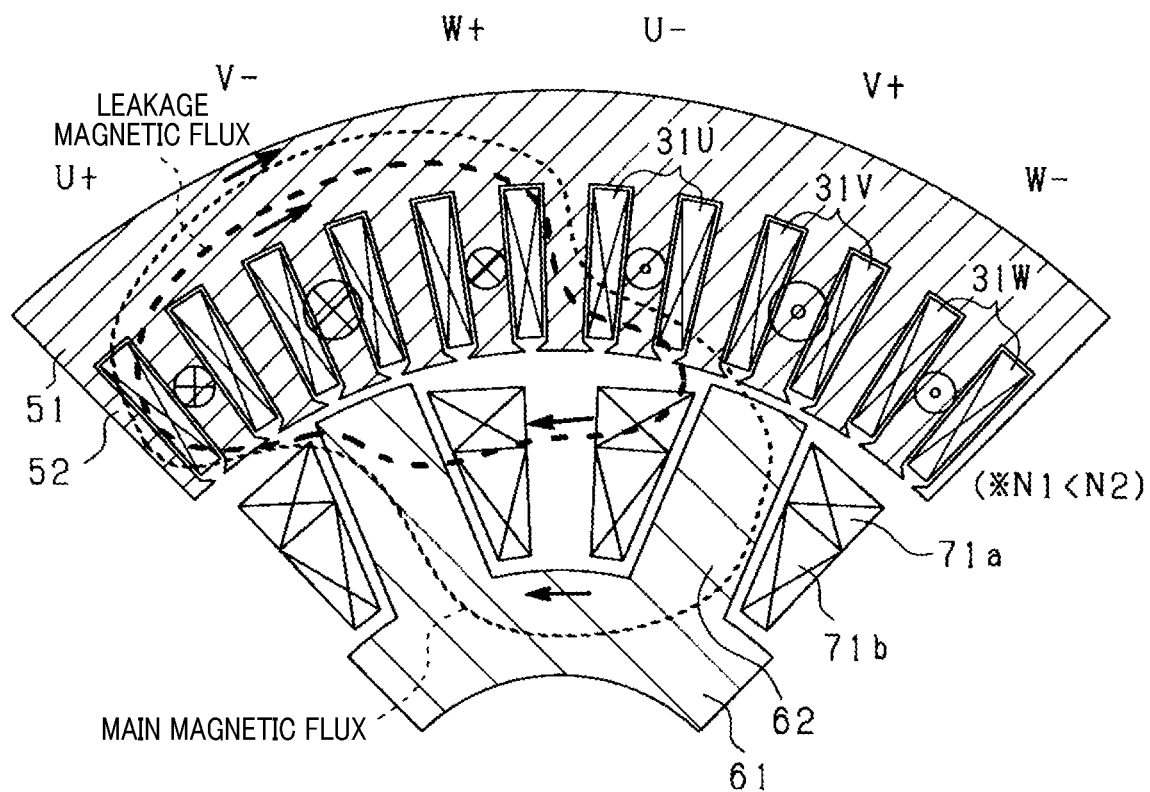
FIG. 22 is an explanatory diagram illustrating the flow of magnetic fluxes in the field coil type rotating electric machine according to the second embodiment in an almost maximum-load state.

Specifically, FIG. 21 illustrates the flow of magnetic fluxes in the rotating electric machine 30 in an almost no-load state. FIG. 22 illustrates the flow of magnetic fluxes in the rotating electric machine 30 in an almost maximum-load state. As shown in FIGS. 21 and 22, in practice, leakage magnetic flux is generated in addition to the main magnetic flux in the rotating electric machine 30. The leakage magnetic flux flows as indicated with thick dashed lines in FIGS. 21 and 22, while the main magnetic flux flows as indicated with thin dashed lines in FIGS. 21 and 22. Due to the leakage magnetic flux, S1 tends to become larger than S2 and m1 tends to become shorter than m2. Accordingly, S1/m1 tends to become greater than S2/m2. As can be seen from the above equations (eq18) and (eq19), when S1/m1>S2/m2, for setting the inductance L1 of the first winding 71*a* and the inductance L2 of the second winding 71*b* to be equal to each other (i.e., L1=L2), it is necessary to set the number of turns N1 of the first winding 71*a* to be smaller than the number of turns N2 of the second winding 71*b* (i.e., N1<N2).

In view of the above, in the present embodiment, the number of turns N1 of the first winding 71*a* and the number of turns N2 of the second winding 71*b* are set to satisfy the relationship of (N1<N2). Consequently, it becomes possible to set the first resonance frequency f1 and the second resonance frequency f2 to be equal to each other, thereby effectively increasing the field current If and thus the torque of the rotating electric machine 30.

Moreover, the supply of the harmonic currents to the phase windings 31U-31W of the stator coil 31 causes the magnetic field applied to the field coil 70 to vary. In the present embodiment, the first winding 71*a* is radially located closer to the stator 50 than the second winding 71*b* is. Therefore, the variation in the magnetic field applied to the first winding 71*a* is greater than the variation in the magnetic field applied to the second winding 71*b*. Further, the variation in the magnetic field applied to the field coil 70 causes the field current If flowing in the field coil 70 to vary. Since the variation in the magnetic field applied to the first winding 71*a* is greater than the variation in the magnetic field applied to the second winding 71*b*, the variation in the electric current IL1 flowing through the first winding 71*a* is accordingly greater than the variation in the electric current IL2 flowing through the second winding 71*b* as shown in FIG. 14. In view of the above, in the present embodiment, the number of turns N1 of the first winding 71*a* is set to be smaller than the number of turns N2 of the second winding 71*b*. Consequently, it becomes possible to suppress the ripple of the field current If flowing in the field coil 70 while increasing the field current If.

In addition, in the present embodiment, the phase offset θs between the electric current IL1 flowing through the first winding 71*a* and the electric current IL2 flowing through the second winding 71*b* is set to be in the range of (120°<θs<240°), as in the first embodiment. Consequently, the variation in the electric current IL1 flowing through the first winding 71*a* can be at least partially canceled by the variation in the electric current IL2 flowing through the second winding 71*b*, thereby further suppressing the ripple of the field current If flowing in the field coil 70.

Third Embodiment

Figure 23:
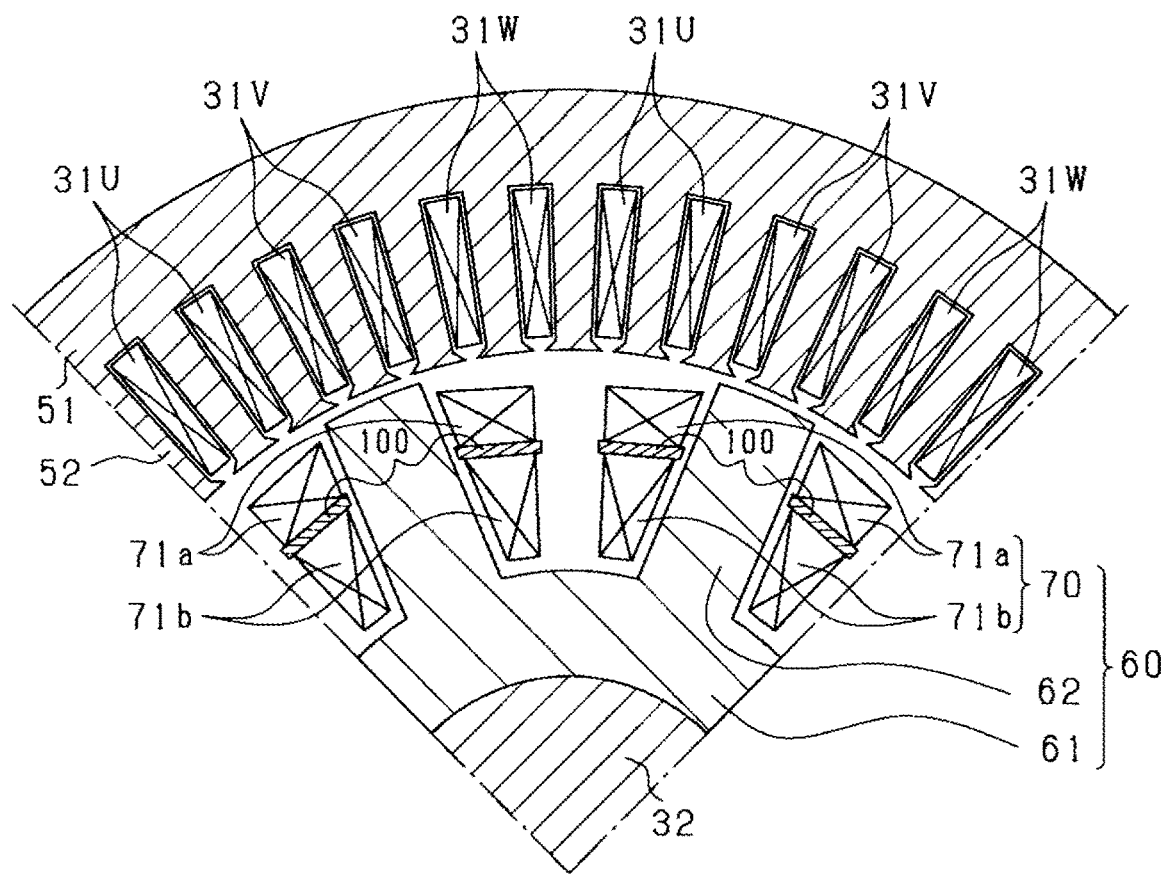
FIG. 23 is a transverse cross-sectional view of both part of a rotor and part of a stator of a field coil type rotating electric machine according to a third embodiment.

In the present embodiment, as shown in FIG. 23, in the rotor 60, there are provided partitioning members 100 between the first and second windings 71*a* and 71*b* of the field coil 70; the partitioning members 100 are formed of a soft-magnetic material. Each of the partitioning members 100 is, for example, ring-shaped and has one of the main poles 62 of the rotor 60 inserted in a center hole thereof. Moreover, when viewed along the axial direction, each of the partitioning members 100 has an elongate shape extending in the circumferential direction. With the partitioning members 100 interposed between the first and second windings 71*a* and 71*b* of the field coil 70, the two windings 71*a* and 71*b* are radially separated from each other. In addition, the partitioning members 110 have a smaller radial thickness than each of the first and second windings 71*a* and 71*b*; the partitioning members 110 also have a larger circumferential length than each of the first and second windings 71*a* and 71*b*.

Figure 24:
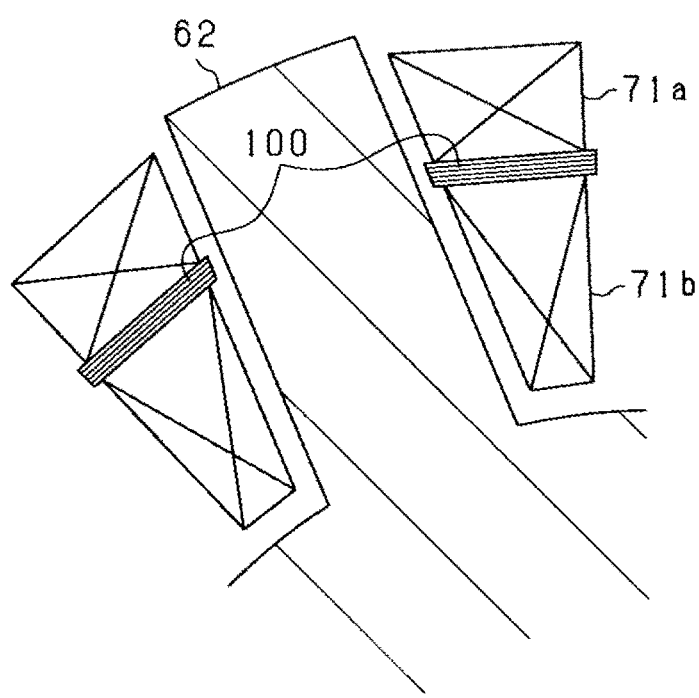
FIG. 24 is an enlarged view of part of FIG. 23.

Moreover, as shown in FIG. 24, each of the partitioning members 100 may be formed of a plurality of sheets that are made of a soft-magnetic material (e.g., magnetic steel) and laminated in a radial direction. With the above configuration, it is possible to lower eddy current loss in the partitioning members 100. In addition, with the sheets being laminated in the radial direction, it is possible to set the radial thickness of the partitioning members 100 to a small value according to the thickness of the sheets while securing the circumferential length of the partitioning members 100.

In the present embodiment, with the partitioning members 100 interposed between the first and second windings 71*a* and 71*b* of the field coil 70, most of the leakage magnetic flux flows through the partitioning members 100, not through the field coil 70. Consequently, it becomes difficult for voltages of opposite polarities to be induced respectively in the first and second windings 71*a* and 71*b*; it also becomes difficult for voltages of opposite polarities to be induced respectively in different parts of each of the first and second windings 71*a* and 71*b*. As a result, it becomes possible to increase electric current induced in each of the first and second windings 71a and 71b in each of the four patterns shown in FIG. 8.

In addition, the rotor 60 shown in FIG. 20 may also have partitioning members interposed between the first and second windings 74a and 74b of the field coil 73.

Fourth Embodiment

Figure 25:
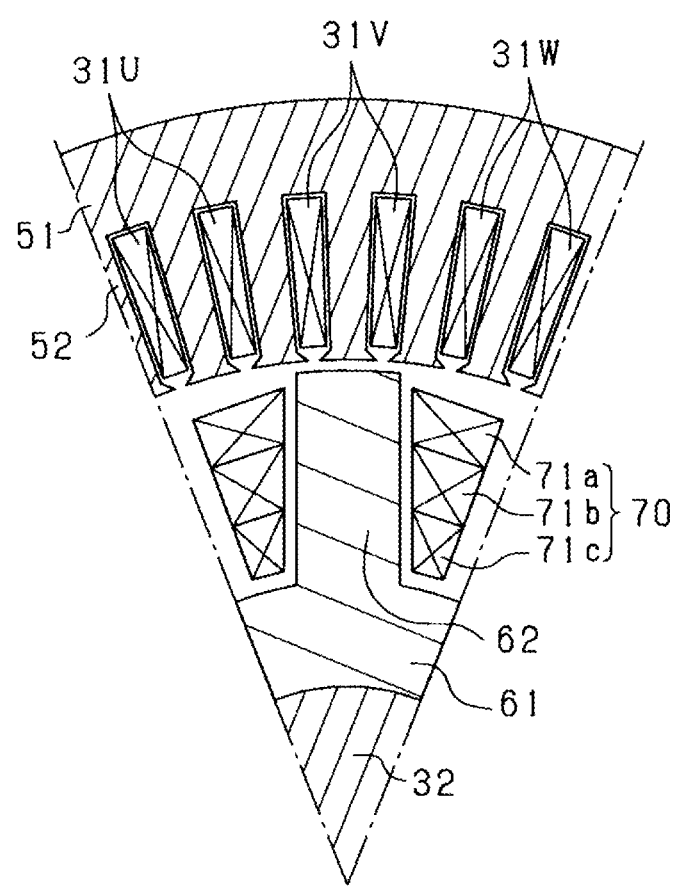
FIG. 25 is a transverse cross-sectional view of both part of a rotor and part of a stator of a field coil type rotating electric machine according to a fourth embodiment.

In the present embodiment, as shown in FIG. 25, the field coil 70 is constituted of a serially-connected winding set consisting of a first winding 71a, a second winding 71b and a third winding 71c that are connected in series with each other. Each of the first to the third windings 71a-71c is wound on all of the main poles 62 of the rotor 60. More specifically, on each of the main poles 62, the first to the third windings 71a-71c are wound so that: the first winding 71a is located radially outermost (i.e., closest to the stator 50); the third winding 71c is located radially innermost (i.e., furthest from the stator 50); and the second winding 71b is radially interposed between the first winding 71a and the third winding 71c. Moreover, on each of the main poles 62, the first to the third windings 71a-71c are wound in the same direction. Furthermore, for each circumferentially-adjacent pair of the main poles 62, the winding direction of the first to the third windings 71a-71c on one of the main poles 62 of the circumferentially-adjacent pair is opposite to the winding direction of the first to the third windings 71a-71c on the other of the main poles 62 of the circumferentially-adjacent pair. Consequently, the magnetization directions of the main poles 62 of the circumferentially-adjacent pair are opposite to each other.

Figure 26:
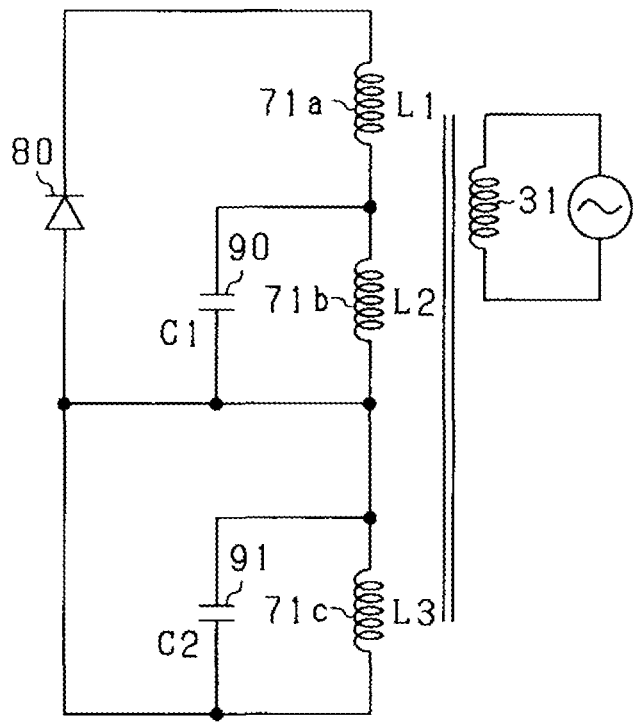
FIG. 26 is a schematic circuit diagram illustrating an electric circuit formed in the rotor of the field coil type rotating electric machine according to the fourth embodiment.

FIG. 26 shows an electric circuit formed in the rotor 60 that has the first to the third windings 71a-71c of the field coil 70 wound on the same main poles 62.

In the rotor 60, there is further provided a second capacitor 91 in addition to the capacitor 90 (hereinafter, to be referred to as the first capacitor 90). A first end of the third winding 71c is connected with the second end of the second winding 71b. A second end of the third winding 71c is connected with the anode of the diode 80. The second capacitor 91 is connected in parallel with the third winding 71c. In addition, in FIG. 26, L3 represents the inductance of the third winding 71c and C1 and C2 respectively represent the capacitances of the first and second capacitors 90 and 91.

The first winding 71a of the field coil 70, the first capacitor 90 and the diode 80 together form a first series resonant circuit. The first series resonant circuit has a resonance frequency which will be referred to as the first resonance frequency f1 hereinafter; the first resonance frequency f1 can be calculated by the equation (eq1) described in the first embodiment. The second winding 71b of the field coil 70 and the first capacitor 90 together form a first parallel resonant circuit. The first parallel resonant circuit has a resonance frequency which will be referred to as the second resonance frequency f2 hereinafter; the second resonance frequency f2 can be calculated by the equation (eq2) described in the first embodiment. The first and second windings 71a and 71b of the field coil 70, the second capacitor 91 and the diode 80 together form a second series resonant circuit. The second series resonant circuit has a resonance frequency which will be referred to as the third resonance frequency f3 hereinafter; the third resonance frequency f3 can be calculated by the following equation (eq20). The third winding 71c of the field coil 70 and the second capacitor 91 together form a second parallel resonant circuit. The second parallel resonant circuit has a resonance frequency which will be referred to as the fourth resonance frequency f4 hereinafter; the fourth resonance frequency f4 can be calculated by the following equation (eq21).

$$f3 = \frac{1}{2\pi\sqrt{(L1+L2)\cdot C2}} \quad \text{(eq20)}$$

$$f4 = \frac{1}{2\pi\sqrt{L3\cdot C2}} \quad \text{(eq21)}$$

The second series resonant circuit and the second parallel resonant circuit function similarly to the first series resonant circuit and the first parallel resonant circuit.

With the above configuration, when the frequency fh of the harmonic currents supplied to the phase windings 31U-31W of the stator coil 31 deviates from a given frequency (e.g., the first resonance frequency f1), if the frequency fh is equal or close to the third resonance frequency f3 or the fourth resonance frequency f4, it is still possible to increase the field current If flowing in the field coil 70. It should be noted that similar to the first and second resonance frequencies f1 and f2, the third and fourth resonance frequencies f3 and f4 may be set to be equal to each other (i.e., f3=f4).

In addition, the frequency fh of the harmonic currents supplied to the phase windings 31U-31W of the stator coil 31 may deviate from a given frequency when the electrical angular frequency of the rotating electric machine 30 is high. This is because the higher the electrical angular frequency, the smaller the number M of cycles of the harmonic currents allowed to be superimposed per period of the fundamental currents (here, M is a natural number) and thus the larger the variation in the frequency fh when the number of cycles of the harmonic currents superimposed per period of the fundamental currents is changed from M to (M−1). For example, when the number M is changed between 4 and 3, the variation in the frequency fh is about 30%. Here, "M=3" represents that for each of the phase currents of the stator coil 31, the number of cycles of the harmonic current superimposed on the fundamental current of the phase current per period of the fundamental current is equal to 3; and 3 is considered to be the minimum value of M which can be used to induce the field current If in the field coil 70.

Modification of Fourth Embodiment

Figure 27:
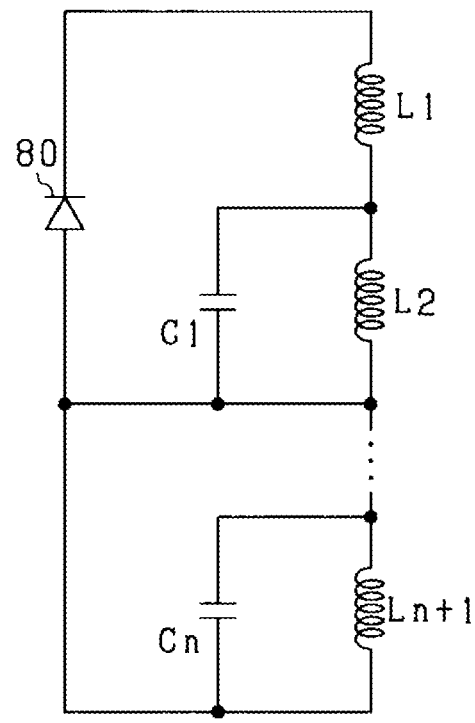
FIG. 27 is a schematic circuit diagram illustrating an electric circuit formed in a rotor according to a modification of the fourth embodiment.

As shown in FIG. 27, the field coil 70 may also be constituted of a serially-connected winding set consisting of (n+1) windings that are connected in series with each other, where n is a natural number greater than or equal to 3. In this case, the number of the capacitors included in the electric circuit formed in the rotor 60 is equal to n.

While the above particular embodiments and modifications have been shown and described, it will be understood by those skilled in the art that various further modifications, changes and improvements may be made without departing from the spirit of the present disclosure.

(1) In the above-described first embodiment, the inductances L1 and L2 of the first and second windings 71a and 71b are set to satisfy both the mathematical expressions (eq3) and (eq4). More particularly, the inductances L1 and L2 of the first and second windings 71a and 71b are set to satisfy both the relationships of (0.5<L2/L1<2) and (0.5<L1/L2<2).

As an alternative, the inductances L1 and L2 of the first and second windings 71a and 71b may be set to satisfy either one of the mathematical expressions (eq3) and (eq4). More particularly, the inductances L1 and L2 of the first and second windings 71a and 71b may be set to satisfy either one of the relationships of (0.5<L2/L1<2) and (0.5<L1/L2<2).

(2) In the above-described embodiments, the rotating electric machine 30 is of an inner rotor type where the rotor 60 is arranged radially inside the stator 50. As an alternative, the rotating electric machine 30 may be of an outer rotor type where a rotor is arranged radially outside a stator. In this case, the rotor may include a rotor core and main poles arranged in alignment with each other in the circumferential direction and each protruding radially inward from the rotor core.

(3) In the above-described embodiments, the field coil 70 is formed of aluminum wires. Alternatively, the field coil 70 may be formed of other materials, such as copper wires or CNTs (Carbon Nanotubes).

Moreover, in the above-described embodiments, the field coil 70 is formed by compression shaping. Alternatively, the field coil 70 may be formed without compression shaping.

What is claimed is:

1. A field coil type rotating electric machine comprising:
a stator including a stator coil that is comprised of a plurality of phase windings;
a field coil including a serially-connected winding pair consisting of a first winding and a second winding that are connected in series with each other; and
a rotor including a rotor core and a plurality of main poles formed at predetermined intervals in a circumferential direction and each radially protruding from the rotor core,
wherein
each of the first and second windings of the field coil is wound on all of the main poles of the rotor,
each of the phase windings of the stator coil is configured to be supplied with harmonic current to induce field current in the field coil,
the rotating electric machine further comprises a diode and a capacitor,
the diode has its cathode connected to a first-winding-side end of the serially-connected winding pair and its anode connected to a second-winding-side end of the serially-connected winding pair,
the capacitor is connected in parallel with the second winding,
in the rotating electric machine, there are formed both a series resonant circuit including the first winding and the capacitor and a parallel resonant circuit including the second winding and the capacitor,
the first winding is radially located closer to the stator than the second winding is,
N1<N2, where N1 is the number of turns of the first winding and N2 is the number of turns of the second winding, and
inductances of the first and second windings are set to satisfy: $120°<θs<240°$, where $θs$ is a phase offset between electric current flowing in the series resonant circuit and electric current flowing in the parallel resonant circuit.

2. The field coil type rotating electric machine as set forth in claim 1, wherein the rotating electric machine has a characteristic such that torque of the rotating electric machine increases as a frequency of the harmonic currents supplied to the phase windings of the stator coil approaches a resonance frequency of the series resonant circuit,
a reference frequency f0, a lower limit frequency fL and an upper limit frequency fH, which respectively represent a value of the frequency of the harmonic currents at which the torque of the rotating electric machine becomes highest, the lower one of two values of the frequency of the harmonic currents at which the torque of the rotating electric machine becomes equal to an allowable lower limit and the higher one of the two values, satisfy the following mathematical expression (c1):

$$\left. \begin{array}{l} fL = (1-A)f0, \quad 0<A<1 \\ fH = (1+B)f0, \quad 0<B<1 \end{array} \right\} \quad (c1)$$

where A and B are predetermined real numbers, and
the inductances of the first and second windings are set to further satisfy the following mathematical expression (c2):

$$\frac{1}{(1+B)^2} < \frac{L2}{L1} < \frac{1}{(1-A)^2} \quad (c2)$$

where L1 is the inductance of the first winding and L2 is the inductance of the second winding.

3. The field coil type rotating electric machine as set forth in claim 2, wherein fL=0.7f0, fH=1.4f0, and 0.5<L2/L1<2.

4. The field coil type rotating electric machine as set forth in claim 2, wherein the allowable lower limit is 80%-90% of a maximum torque that the rotating electric machine generates with the frequency of the harmonic currents set to f0.

5. The field coil type rotating electric machine as set forth in claim 1, wherein the diode comprises a rectification diode and a Zener diode that are connected in parallel with each other.

6. The field coil type rotating electric machine as set forth in claim 1, wherein the diode comprises only a single Zener diode.

7. The field coil type rotating electric machine as set forth in claim 1, wherein the diode comprises a plurality of Zener diodes that are connected in series with each other.

8. The field coil type rotating electric machine as set forth in claim 1, wherein a frequency of the harmonic currents supplied to the phase windings of the stator coil is set to be equal to a resonance frequency of the series resonant circuit.

* * * * *